United States Patent [19]
Backus et al.

[11] Patent Number: 5,731,012
[45] Date of Patent: Mar. 24, 1998

[54] PASTA, PASTRY, COOKIE AND HORS D'OEUVRE MAKER

[75] Inventors: Alan L. Backus, Los Angeles, Calif.; Ronald M. Popeil, Las Vegas, Nev.

[73] Assignee: Ronco R&D Inc., Beverly Hills, Calif.

[21] Appl. No.: 369,629

[22] Filed: Jan. 6, 1995

Related U.S. Application Data

[63] Continuation of Ser. No. 205,498, Mar. 4, 1994, Pat. No. 5,421,713, which is a continuation-in-part of Ser. No. 59,338, May 11, 1993, Pat. No. 5,324,185.

[51] Int. Cl.$^6$ .................... A21C 3/04; B29C 47/38
[52] U.S. Cl. .................... 425/151; 99/348; 366/77; 366/79; 425/186; 425/188; 425/205; 426/516
[58] Field of Search .................... 200/43.11, 43.14, 200/43.15, 43.13, 321, 322, 327, 324, 252, 547, 548; 384/138, 369, 912, 908; 425/151, 203, 152, 205, 209, 311, 308, 464, 378.1, 404, 403.1, 371, 315, 136, 467, 186, 188, 190; 99/348; 426/516, 518, 503, 504, 512; 366/77, 99, 98, 307, 347

[56] References Cited

U.S. PATENT DOCUMENTS

| | | | |
|---|---|---|---|
| 2,983,799 | 5/1961 | Osieja | 200/43.15 |
| 3,324,970 | 6/1967 | McHugh | 384/369 |
| 3,398,250 | 8/1968 | Bowers | 200/547 |
| 3,407,439 | 10/1968 | Gregory | 384/369 |
| 3,712,592 | 1/1973 | Heatcoat . | |
| 3,963,220 | 6/1976 | Ohchi . | |
| 4,000,559 | 1/1977 | Korrenn et al. | 384/369 |
| 4,078,874 | 3/1978 | Lenhardt, Sr. . | |
| 4,097,213 | 6/1978 | McComb et al. . | |
| 4,146,333 | 3/1979 | Zani . | |
| 4,187,412 | 2/1980 | Ernster et al. | 200/321 |
| 4,332,539 | 6/1982 | Zani . | |
| 4,367,064 | 1/1983 | Prandelli et al. . | |
| 4,384,842 | 5/1983 | Cavalli . | |
| 4,391,575 | 7/1983 | Osrow . | |
| 4,465,447 | 8/1984 | Cheigh et al. . | |
| 4,506,990 | 3/1985 | Neier et al. . | |
| 4,650,430 | 3/1987 | Schiek | 384/369 |
| 4,661,364 | 4/1987 | Campbell . | |
| 4,699,525 | 10/1987 | Mizobuchi et al. | 384/369 |
| 4,741,264 | 5/1988 | McPeak . | |
| 4,838,704 | 6/1989 | Carver . | |
| 5,018,955 | 5/1991 | Parrish et al. . | |
| 5,393,217 | 2/1995 | Cheng | 425/205 |
| B1 4,219,318 | 6/1983 | Cavalli . | |

FOREIGN PATENT DOCUMENTS

| | | | |
|---|---|---|---|
| 407365 | 10/1944 | Italy . | |
| 421320 | 5/1947 | Italy . | |
| 451958 | 10/1949 | Italy . | |
| 1343141 | 10/1987 | U.S.S.R. | 384/369 |

OTHER PUBLICATIONS

*Pasta Perfetto*™ Instruction Booklet, Vitantonio Manufacturing Company.
Takka Products Pasta & Dough Machine Recipe & Instruction Booklet.
Pasta–Del–Giorno, by Maverick, Onwers Manual, Model MPM 6468.
Pasta Perfetto Instruction Booklet, by Vitantonio Mfg. Co., No. 900.

*Primary Examiner*—Khanh P. Nguyen
*Attorney, Agent, or Firm*—Christie, Parker & Hale, LLP

[57] ABSTRACT

A device to mix and extrude various ingredients including pastas, pastries, baked goods, hors d'oeuvres, and cookies. The device includes novel measuring, mixing and extrusion arrangements including: an automatic measuring cup; a way to continuously mix and extrude ingredients without intervening cleanings; a mixing and extrusion feed for handling different consistencies of ingredients; an integrated automatic cutter; motor cooling and extruded ingredient drying; as well as various safety devices.

5 Claims, 18 Drawing Sheets

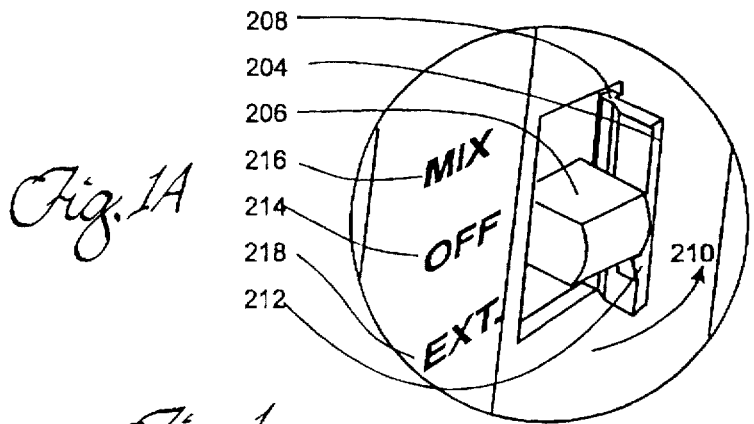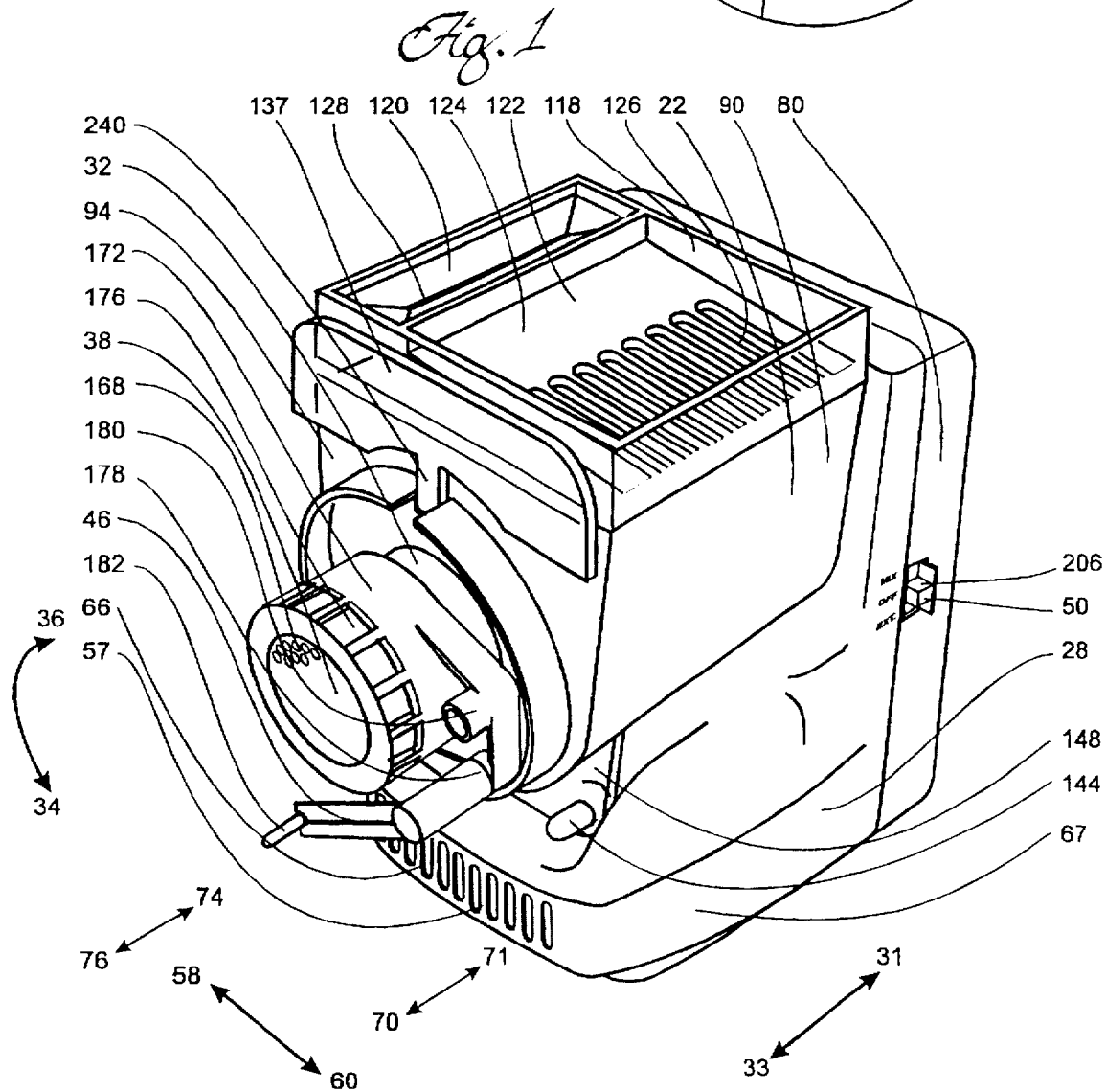

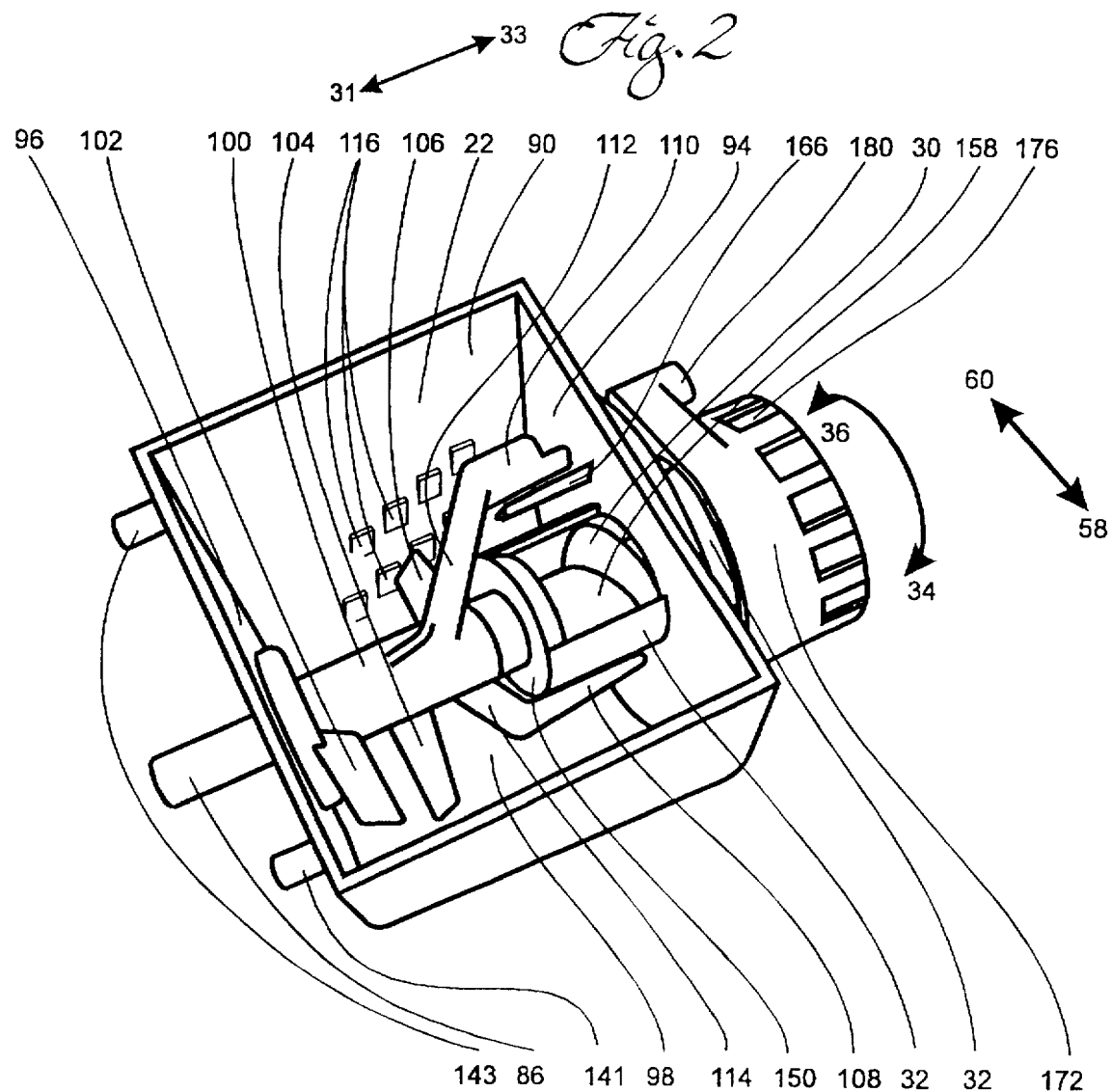

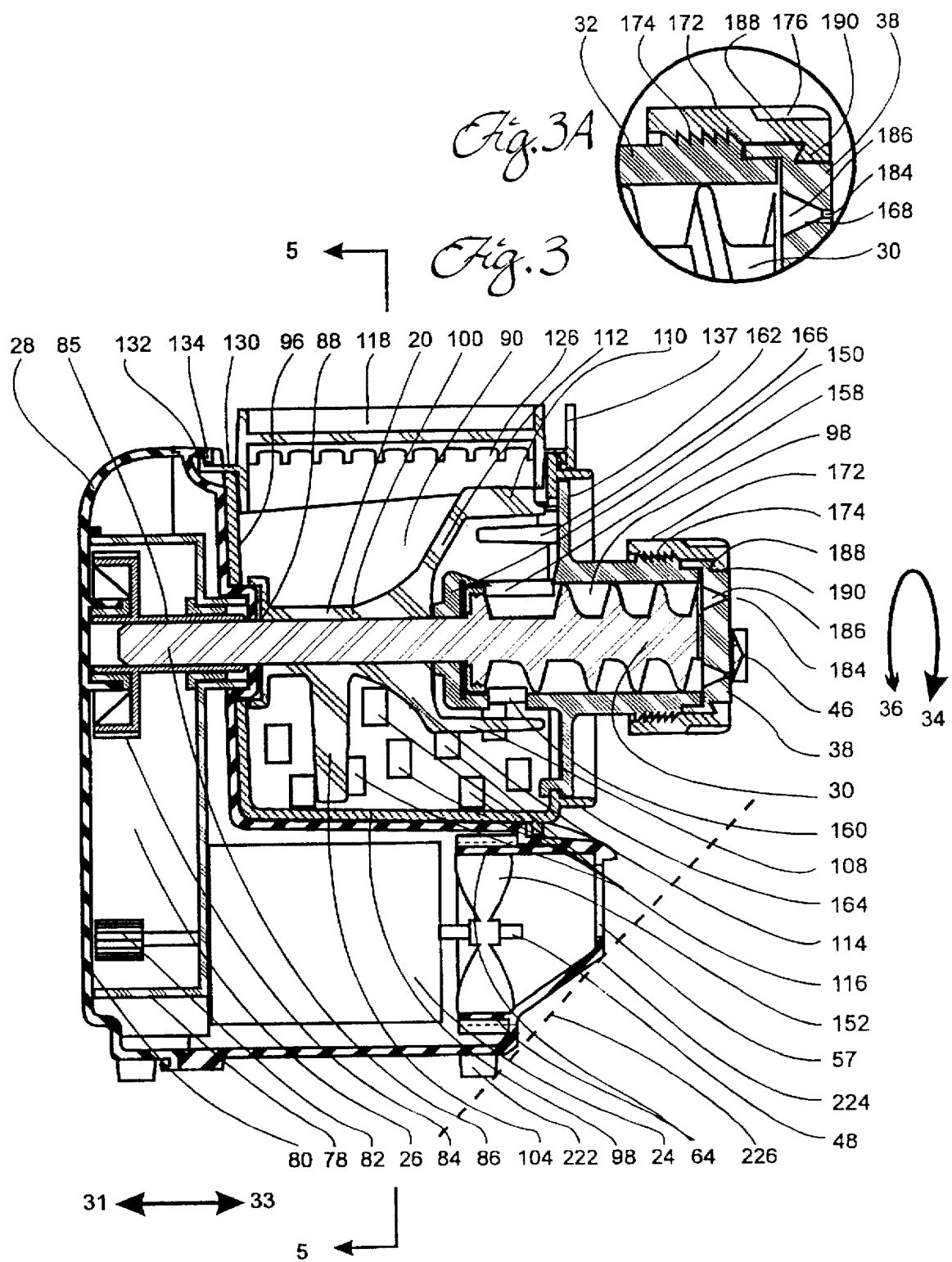

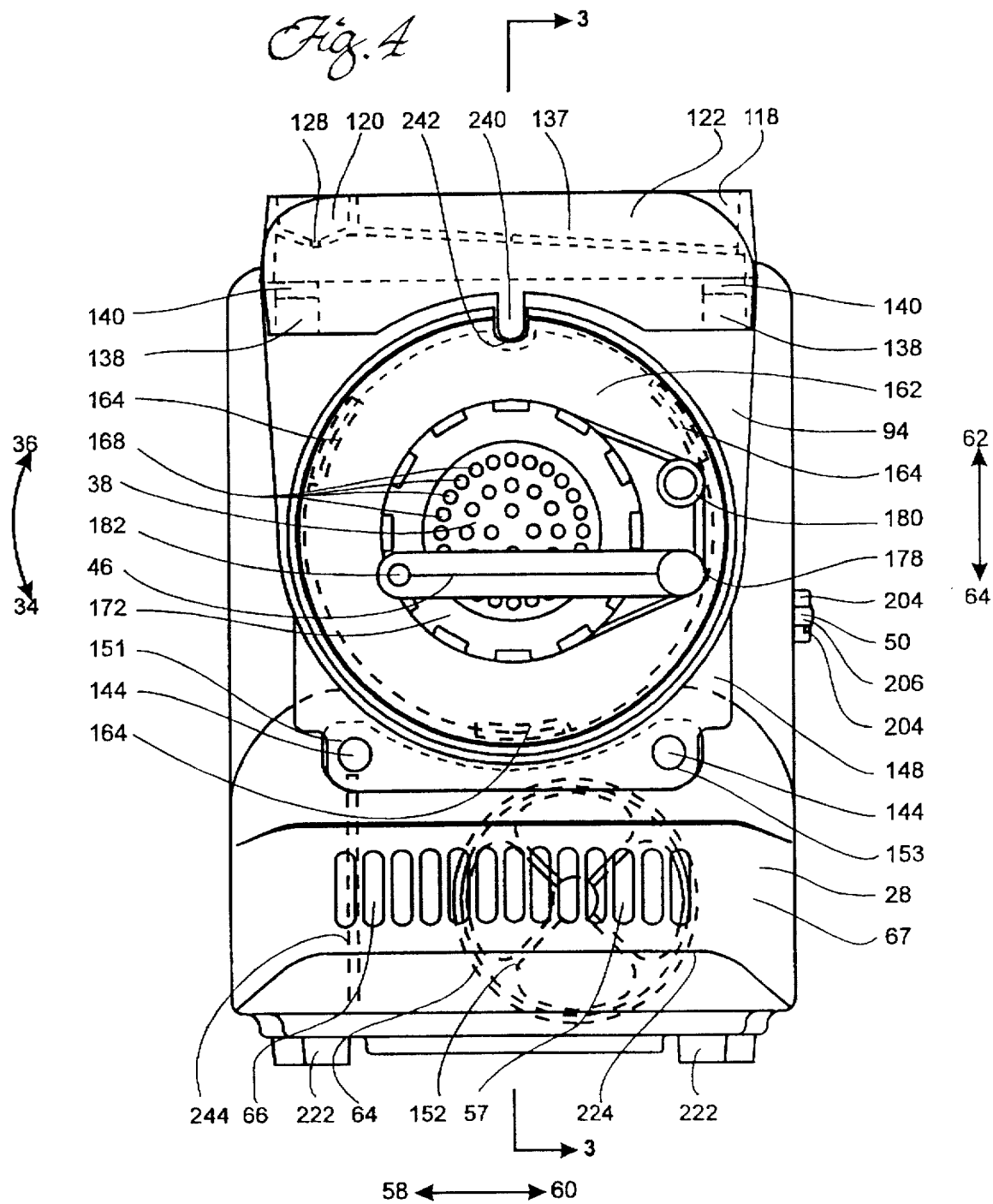

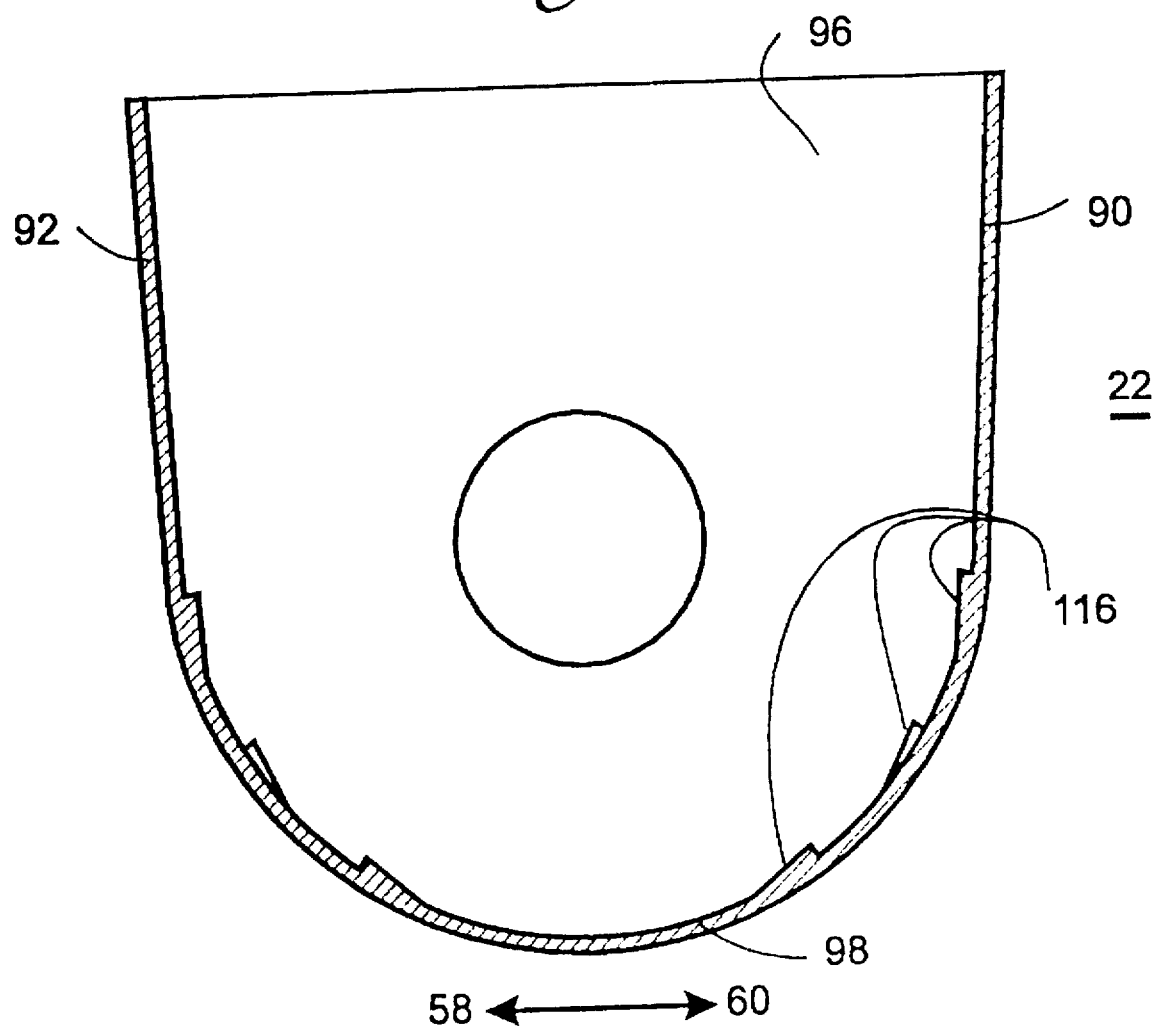

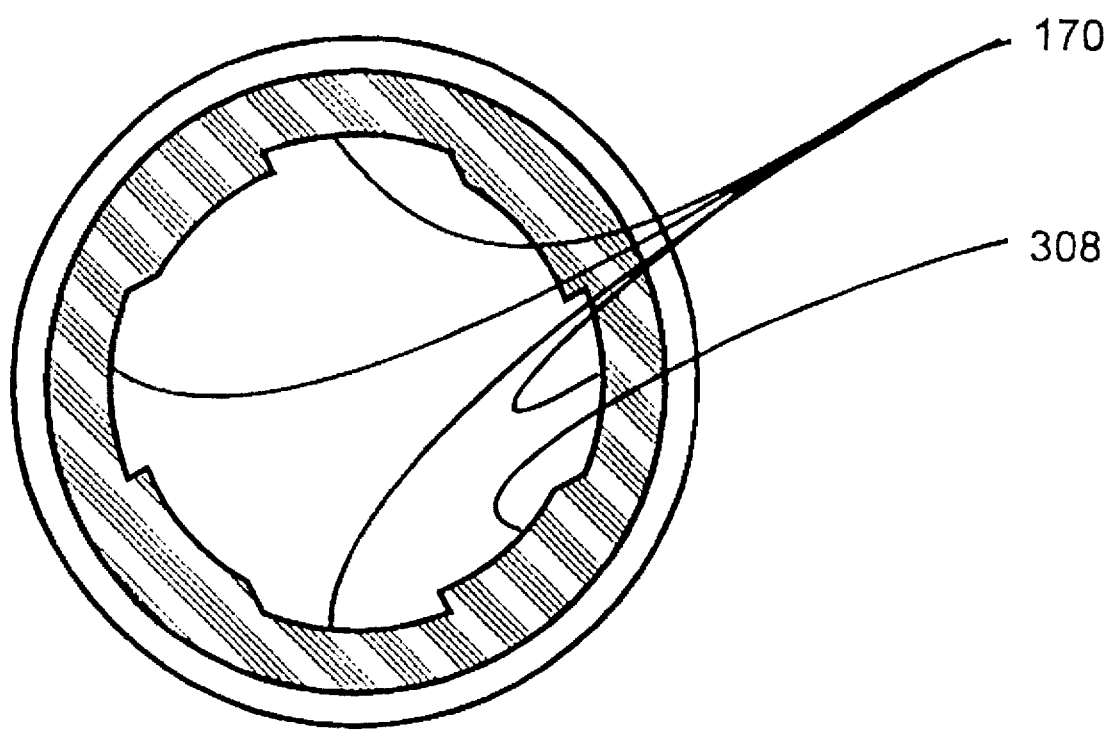

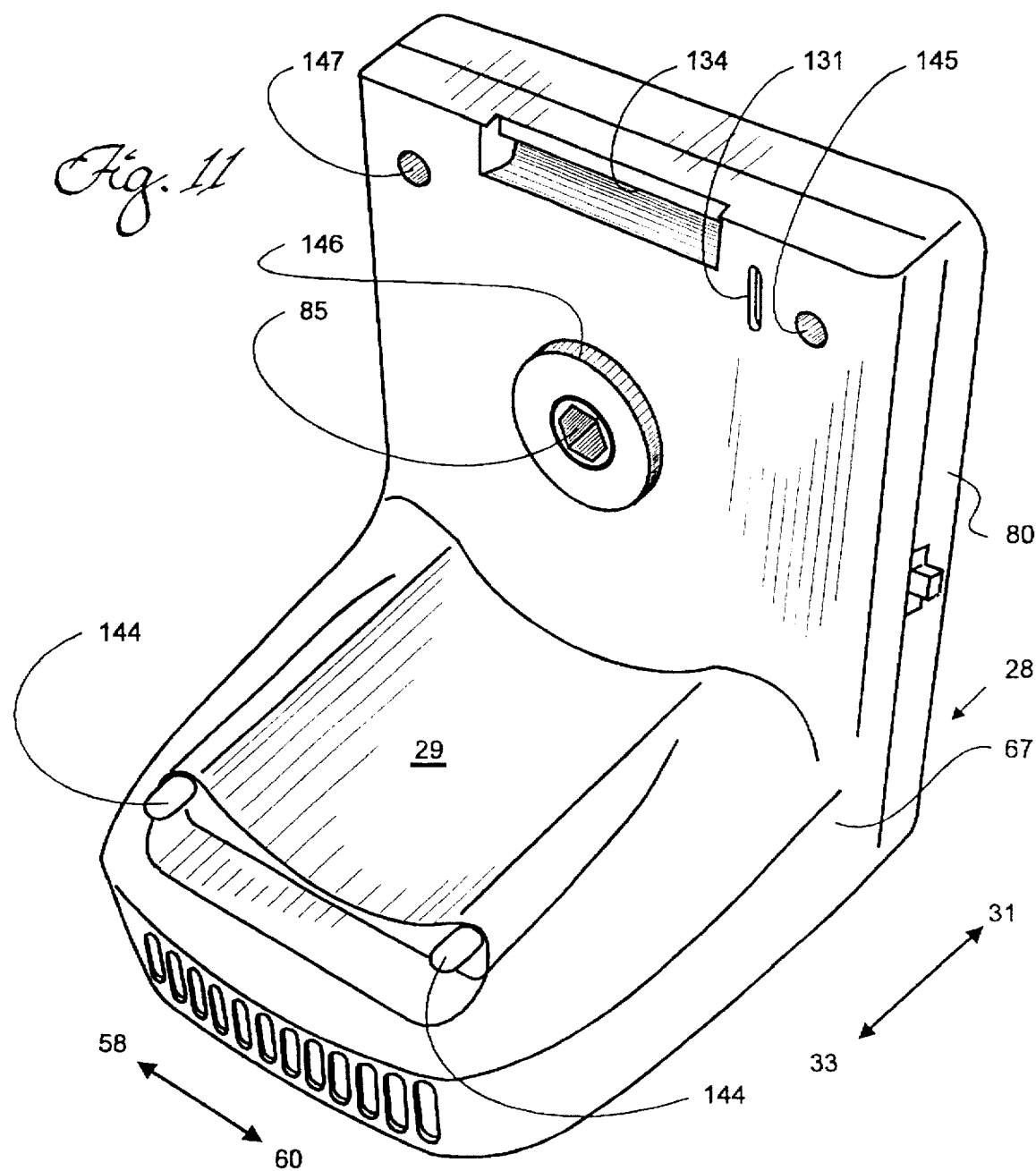

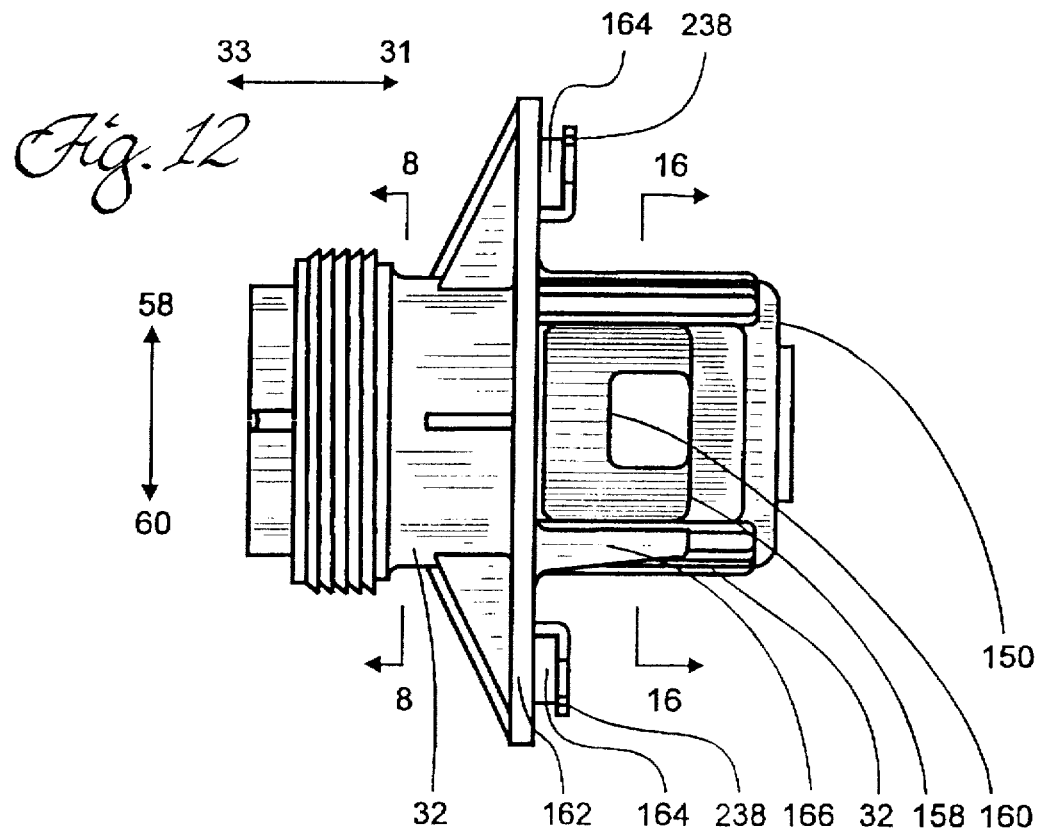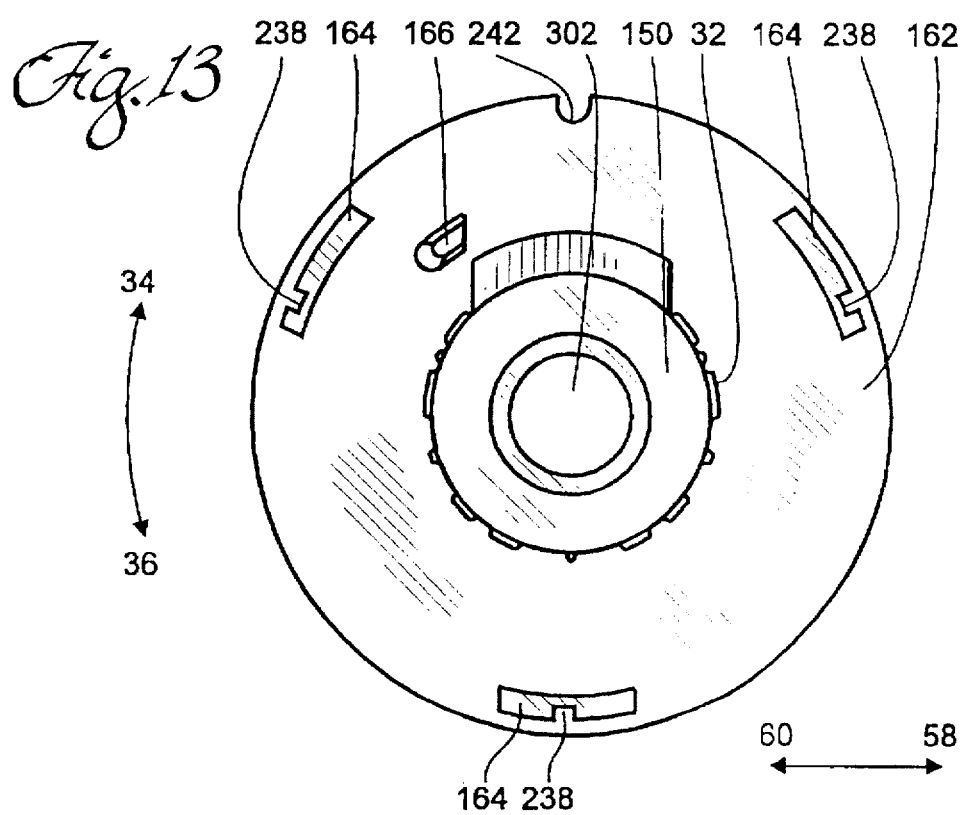

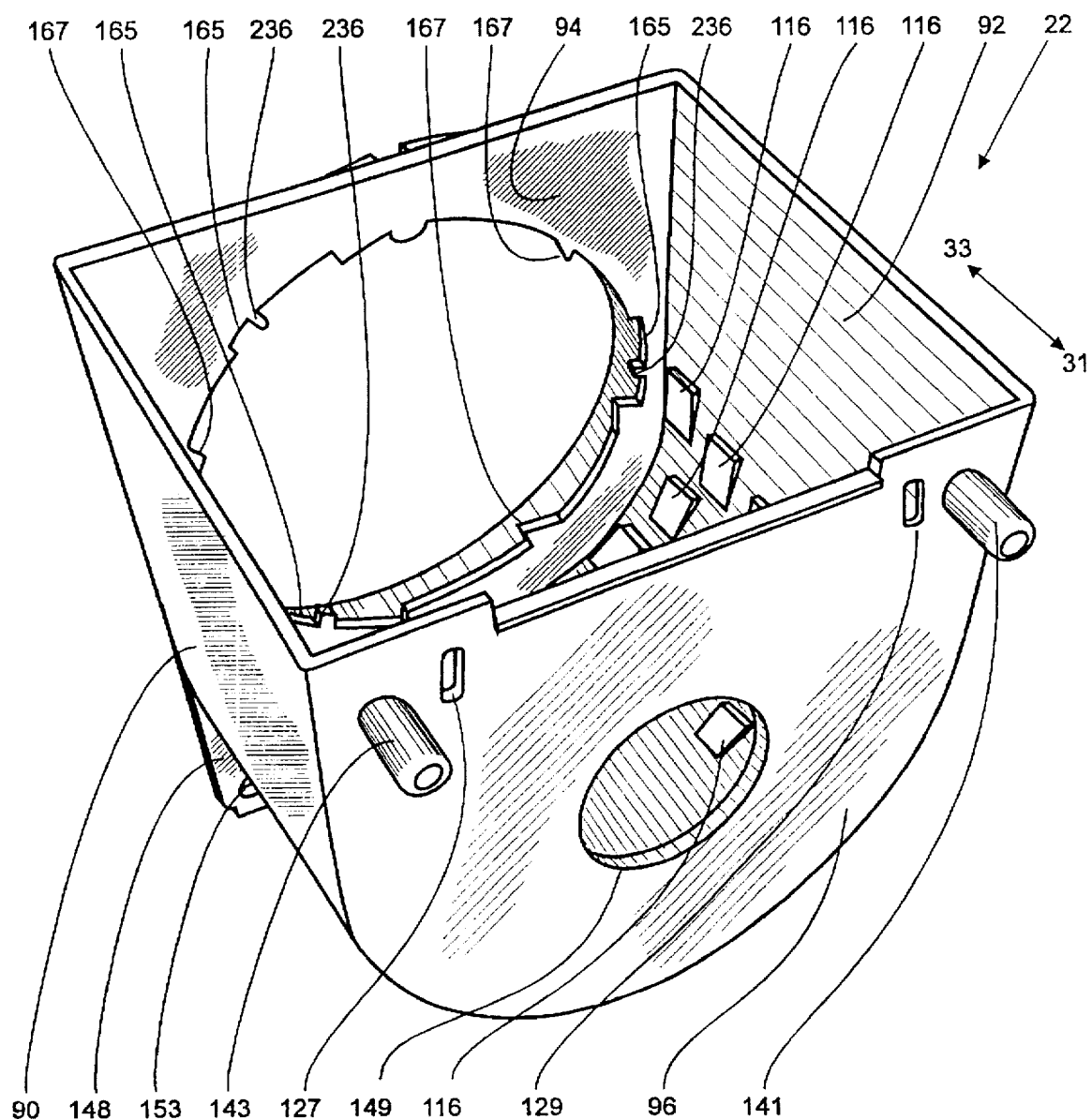

PASTA, PASTRY, COOKIE AND HORS D'OEUVRE MAKER

This application is a continuation of application Ser. No. 08/205,498, filed Mar. 4, 1994 now U.S. Pat. No. 5,421,713, which is a continuation-in-part of patent application Ser. No. 08/059,338, filed May 11, 1993 now U.S. Pat. No. 5,324,185.

BACKGROUND—FIELD OF INVENTION

The present inventions are directed to home electric appliances to make pastas, pastries, cookies hors d'oeuvres and other extrudable food products.

BACKGROUND—DESCRIPTION OF PRIOR ART

Automatic home food mixing and extrusion appliances have been in common use for many years. Automatic pasta making appliances which both mix dough and automatically extrude dough through a die have been patented and in use in the U.S. at least since the late 1970s. In general such appliance have a configuration which includes a bin containing rotating blades, feeding an extrusion screw which forces the mixed materials through an extrusion die.

For the most part, existing pasta makers are limited in capacity, are messy and time consuming to use, and have little versatility.

SUMMARY OF THE INVENTION

The present inventions improve on prior devices in many areas.

Advantages of the present inventions will become apparent from the following description and illustrations of a preferred embodiment.

DESCRIPTION OF DRAWINGS

FIG. 1 is a perspective view of an embodiment constructed according to the present inventions.

FIG. 1A is a detail of FIG. 1 showing the control switch.

FIG. 2 is a top perspective view of mixing and extruding components.

FIG. 3 is a longitudinal vertical section through the center of the embodiment taken along line 3—3 of FIG. 4.

FIG. 3A is a detail of FIG. 3 showing sections of the extruder chamber, extruder screw, die nut, and extrusion die.

FIG. 4 is a front elevation of the embodiment.

FIG. 5 is a cross-sectional view of the mixing bin 22 taken along line 5—5 of FIG. 3.

FIG. 8 is a sectional view through the extruder taken along line 8—8 of FIG. 12.

FIG. 11 is a perspective view of the step shaped enclosure subassembly of the embodiment.

FIG. 12 is a top view of the extruder housing subassembly of the embodiment.

FIG. 13 is a backside view of the extruder housing shown in FIG. 12.

FIG. 14 is a top forward looking perspective view of the embodiment's mixing bin.

FIG. 17A is a detail of the lid shown in FIG. 17 showing how it couples to the mixing bin and step shaped enclosure.

DETAILED DESCRIPTION OF PREFERRED EMBODIMENT

Figure 10:
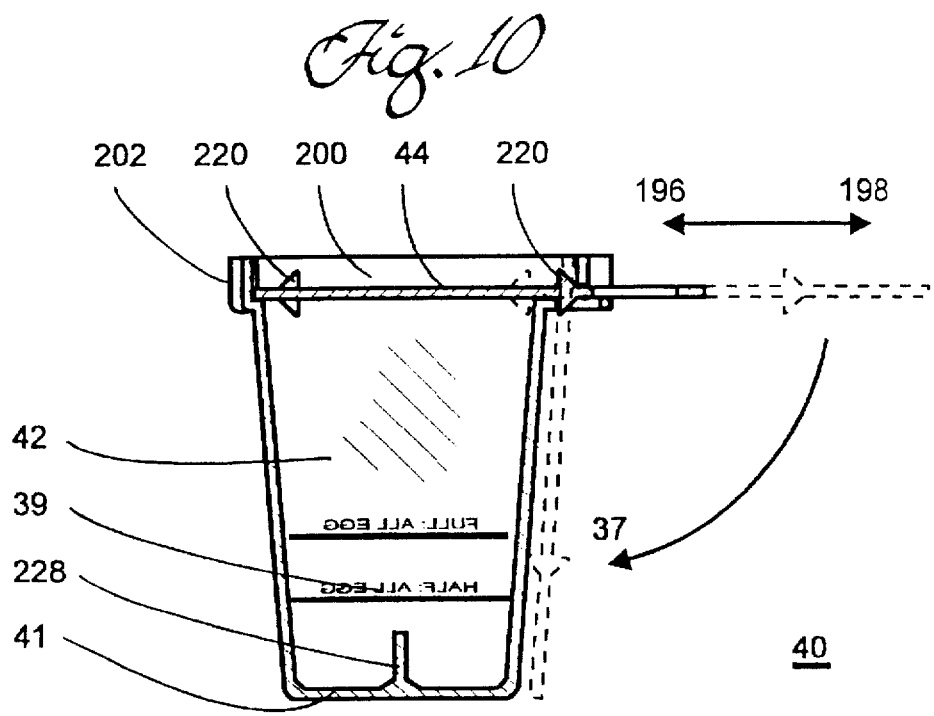
FIG. 10 is a longitudinal vertical section through the center of the measuring cup shown FIG. 9 taken along line 10—10 of FIG. 9.
Figure 15:
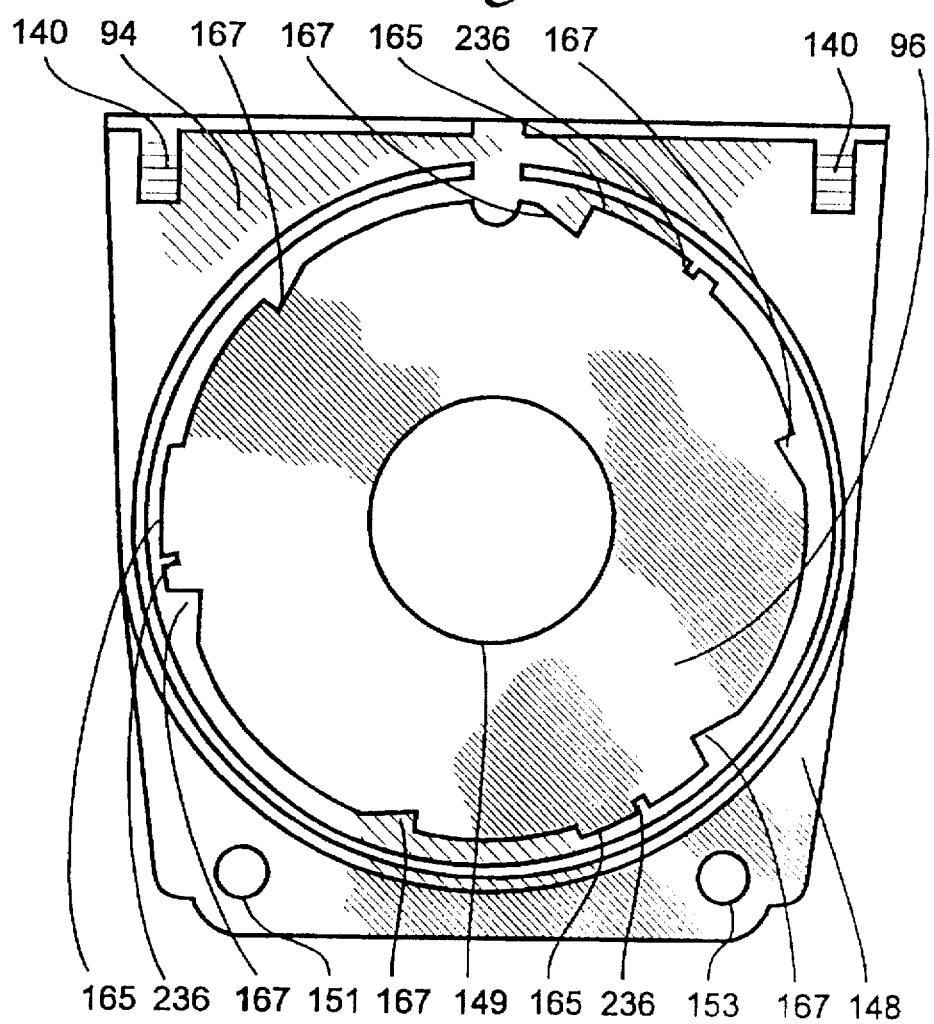
FIG. 15 is a front elevation view of the mixing bin.
Figure 16:
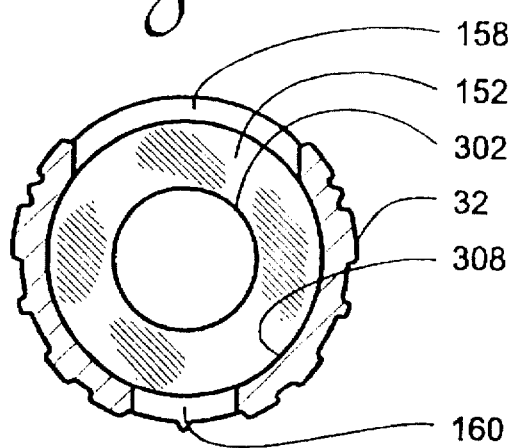
FIG. 16 is a section of FIG. 12 taken along line 16—16 of FIG. 12.

A preferred embodiment of the present inventions has a motor 24 rotated mixer and extruder 30 contained in clear polymeric enclosures 22, 32. The motor 24 and associated transmission 26 are contained in a stepped shaped enclosure 28 (see FIG. 10) which supports and cradles a clear plastic mixing bin 22 within its step. An auger extrusion screw 30 is contained in a cylindrical extruder housing 32 which protrudes into the front 33 of the bin 22 and continues out in front 33 of the flat front face 37 of the bin 22. Whether the embodiment mixes or extrudes is controlled by the direction of rotation 34, 36 of the motor 24 and consequent rotation of the mixing/feeding blades 102, 104, 106, 108, 110 and auger extrusion screw 30. Reverse rotation 34 of the blades 102, 104, 106, 108, 110 and screw 30 backs dough out of the extruder housing 32 and into the mixing bin 22; forward rotation 36 feeds the dough into the extruder screw 30 which in turn presses dough against and through the extrusion die 38. The embodiment may be used as only a slow speed mixer or as both a mixer and extruder. As an example, bread dough might be mixed in the unit without reversing the motor to extrude. Instead the mixed dough would be removed from the bin 22 and baked in a conventional manner.

Specially designed embodiment extrusion dies 38 permit repeated extrusion without intervening cleaning, in part due to die extrusion holes 168 which are contoured to permit dough which dries hard in the holes between extrusion cycles to be extruded.

Specially designed dies with over 20 degrees of taper in their extrusion holes closest to the extruder screw, also make it easy to clean either wet or dry food stuffs and dough from the dies.

A measuring cup 40 with indicia 39 marked on its transparent or translucent sides 42 and a guillotine lid 44 simplifies and makes more precise dry and liquid measurements. Precision is important in many extruded farinaceous food recipes and other extruded food products A pin 228 projecting from the measuring cup's 40 base 41, helps, when the cup is shaken, to break up and mix ingredients being measured. As an example, the pin 228 helps break up and mix the yokes and whites of eggs when they are being measured. This simplifies mixing and generally makes it quicker. It also eliminates having to clean a fork or other mixing instrument. In home pasta makers ease of operation and cleanup is important to both the marketer and the end user.

The mixing cup's lid 44 conveniently flips down 37 when open 198 to make the cup 40 easier to handle.

A rotating cutter arm 46 wipes the front face of the extrusion die 38 and makes cutting extruded materials a quick and simple process.

This preferred embodiment of the present inventions comprises a two piece molded polymeric stepped shaped enclosure 28 containing a reversible permanent magnet dc motor 24 whose horizontal shaft 48 is positioned pointing fore 33 to aft 31 within the enclosure 28.

The permanent magnet dc motor provides the high torque and quiet operation desirable in a home food product mixer/extruder.

The motor 24 is powered by wall power conveyed through a cord entering the rear 31 of the unit. After entering the enclosure and before flowing to the motor 24, the ac current coming through the cord is controlled in a conventional manner in sequence through: a single-pull-single-throw safety interlock momentary-on microswitch which is interconnected to the mixing bin's lid; a full bridge rectifier; and a double-pull-double-throw three position forward-off-reverse switch 50, all of which are conventional and only partially shown in the drawings.

As an alternative, a more sophisticated circuit might be utilized in combination with the above mentioned safety and forward-off-reverse switches. Such a switch/circuit combination might, as an example, provide, in addition to safety interlock, current rectification, current control and direction reversal, all or some of the following features:

A) automatic resetting electrical overload protection to prevent motor damage when heavy mechanical loads are placed on the motor. As an example, this might prevent motor damage if extrusion were attempted before pasta flour had been fully mixed with liquid, B) electric fuse protection for safety against internal electrical malfunctions, C) switching delay in reversing motor shaft rotation from forward to reverse or reverse to forward to prevent stress conditions which might shorten motor life, D) electrical motor breaking by placing a resistance load between the motor terminals to rapidly slow motor shaft rotation, E) switching delay to eliminate switch contact arcing when turning the unit on, F) rectification of input electrical power from alternating current to direct current, G) alteration of input voltage so, as an example, a 120 volt motor might operate from a 230 volt power source, H) reduction of RF emissions, I) timing functions so, as an example, the mixing and/or extrusions cycles might be automatically timed, Of course, such a circuit might provide additional features as well, such as indicator lights, as an example for on/off, or mix, and extrude, or lights indicating improper component assembly, etc.

Figure 22:
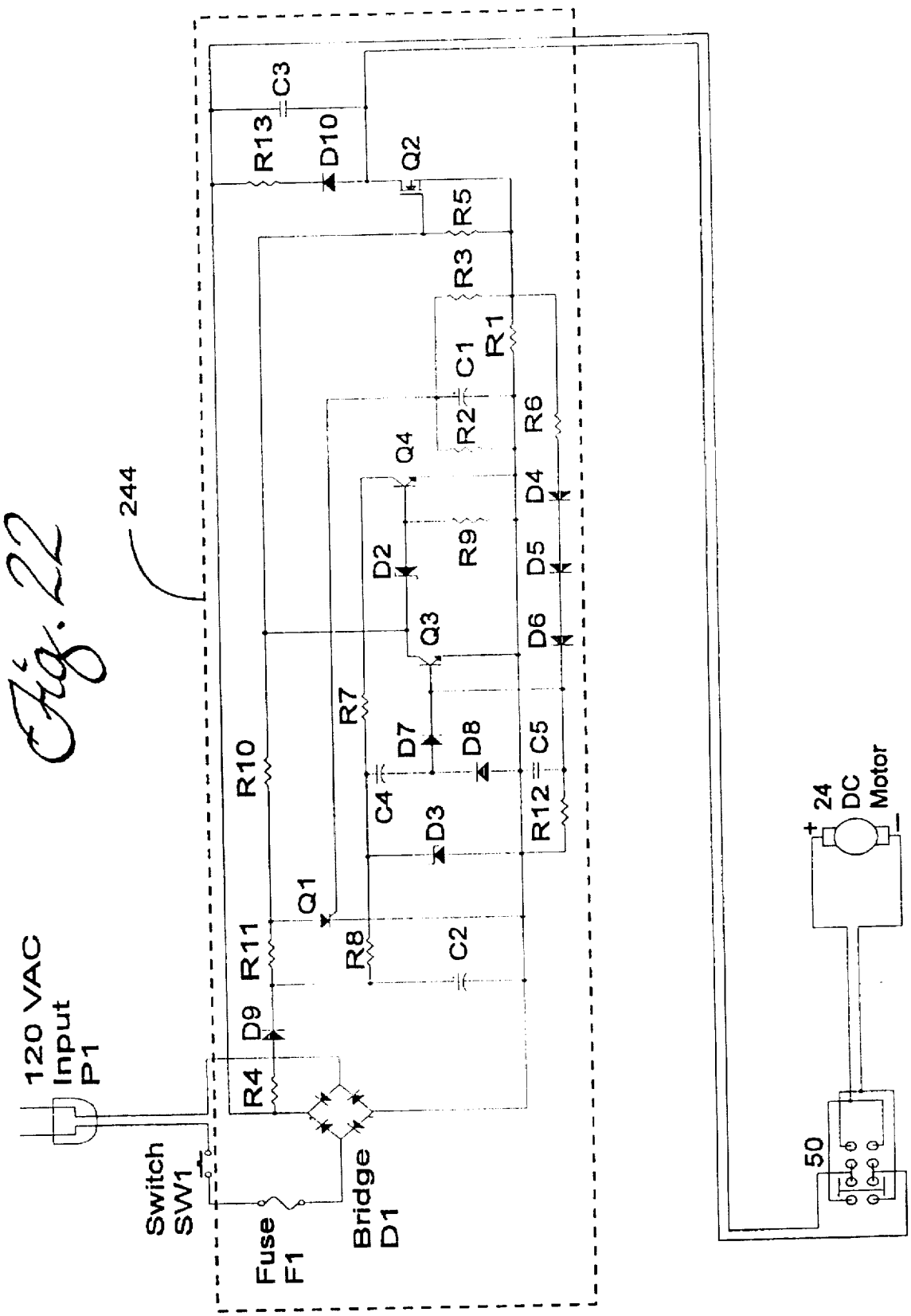
FIG. 22 is a schematic of the embodiment's motor control circuit.
Figure 23:
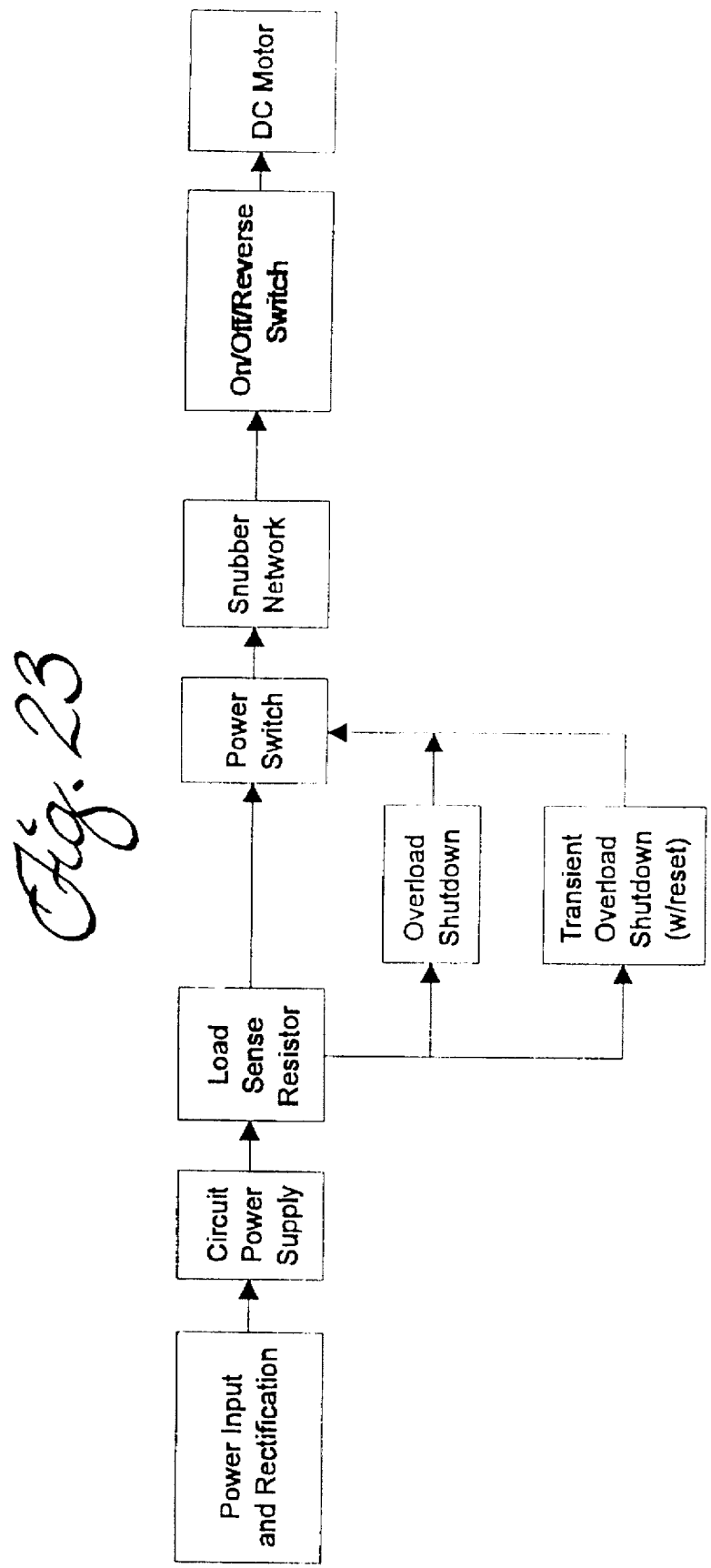
FIG. 23 is a block diagram of the circuit shown in FIG. 22.

FIGS. 22 and 23 show a circuit 244 which provides several of the above features (including features A, B, C, D, F, and H from the above list).

Basically this circuit 244 works as follows.

The circuit 244 shown in FIGS. 23 and 24 will provide protection for a DC motor against overload or sudden direction reversal. This is accomplished by sensing the motor current and then taking appropriate action if necessary. The circuit can be divided into the functional blocks shown in FIG. 23 to help clarify it's operation. The correlation between the functional blocks and the schematic is as follows:

| Functional Block | Schematic Components |
| --- | --- |
| Power Input and Rectification | Plug P1, switch SW1, fuse F1, and diode bridge D1 |
| Circuit Power Supply | Resistor R4, diode D9, and capacitor C2 |
| Load Sense Resistor | Power resistor R1 |
| Power Switch | Power transistor (MOSFET) Q2, resistors R5, R10, and R11 |
| Snubber Network | Power resistor R13, capacitor C3, and diode D10 |
| On/Off/Reverse Switch | DPTT switch 50 |
| DC Motor | DC motor 24 |
| Overload Shutdown | Resistors R2 and R3, capacitor C1, and SCR Q1 |
| Transient Overload Shutdown (w/reset) | Transistors Q3 and Q4, resistors R6, R7, R8, R9 and R12, diodes D4, D5, D6, D7 and D8, zener diodes D2 and D3, and capacitors C4 and C5 |

The Power Input and Rectification block shown in this circuit is for use with 120 VAC, 60 Hz power. It provides a power cord and plug (P1), safety interlock switch (SW1), safety fuse (F1), and a full-wave bridge rectifier (D1) to convert the AC into unfiltered DC. This block can be any other circuit or device that provides power appropriate for the chosen DC motor (24). The design presented for this block is for illustrative purposes only.

The Circuit Power Supply block is a simple, unregulated Diode (D1)/Capacitor (C2) power supply. The resistor R4 is added to limit the inrush current at power up to provide long-term, reliable operation.

The Load Sense Resistor (R1) is used to detect motor current. Since all power that flows through the DC motor (24) also flows through the FET (Q2) and through this resistor, the voltage across this resistor is proportional to the motor current.

The Power Switch block comprises of the FET Q2 and resistors R5, R10 and R11. The FET is the actual switching device while the resistors provide default control voltage to the gate terminal of the FET. Note that the maximum recommended gate voltage of a FET is 20V. Zener diode D2 assures that the gate voltage in this circuit does not exceed 18V. The Snubber Network block uses R13 to dissipate excess motor energy in the event the motor direction switch 50 is suddenly thrown from one direction to the other. Diode D10 is reverse-biased during normal operation an prohibits R13 from dissipating energy. Capacitor C3 is used to limit dv/dt so that no damaging high-voltage transients are presented to the drain terminal of the FET.

The On/Off/Reverse Switch (50) is used to control the state (on or off) and the direction (normal or reverse) of the DC Motor (24).

The Overload Shutdown block uses Silicon Control Rectifier (SCR) Q1 to turn off the FET (Q2), and thus the DC motor, if the current drawn by the DC Motor (24) exceeds a given average value. A resistor divider comprising of resistors R2 and R3 determine the exact overcurrent threshold. Since R2 and R3 are placed across the Load Sense Resistor (R1), the voltage at the junction of R2 and R3 is proportional to the motor current. This voltage is fed to the gate terminal of the SCR, which has a rated turn-on threshold voltage. Capacitor C1 is also connected to this junction to provide an averaging effect so that the circuit doesn't trip on normal power surges such as during motor start-up.

The Transient Overload Shutdown (w/reset) block uses transistor Q3 to turn off the FET (Q2), and thus the DC motor, if the current drawn by the DC Motor (24) exceeds a given instantaneous value. This occurs when the voltage across the Load Sense Resistor (R1) exceeds approximately 2.8V, which is the sum of three forward-biased diode drops (D4, D5 and D6) and the base-to-emitter voltage of transistor Q3. Once Q3 is even slightly turned-on, it's collector-to-emitter voltage begins to drop and transistor Q4 looses it's bias current (and immediately shuts off), causing transistor Q3 to turn-on even harder since R8 is now free to pass current to Q3's base via capacitor C4 and diode D7. As long as Q3 is turned-on, the FET (Q2), and thus the DC motor, are turned off because the FET's gate terminal is pulled to ground via connection to Q3's collector. This motor-off condition remains until the voltage across capacitor C4 reaches the clamping voltage of zener diode D3, after which transistor Q3 looses it's base drive current and turns back off. When Q3 turns off, Q4 regains it's base drive current through R11, R10 and D2. As Q4 turns back on, capacitor C4 quickly discharges through R7 and D8 to prepare the circuit for another shutdown if necessary. Resistor R6 is added to prevent damaging high-current transients from flowing through D4, D5, D6, and Q3. Capacitor C5 eliminated false triggers due to typical DC motor electrical noise. Resistor R12 keeps the base voltage of Q3 at ground to prevent false triggering when an overcurrent condition does not exist.

Circuits for adding the other features mentioned above such as timing and indicator lights are well known and thus are not shown here.

On the most forward 33 end of the motor shaft 48 there is a fan 152 mounted to, and rotated by, the motor shaft 48. This fan 152 is disposed within a cylindrical fan duct 64 which is vented at its front 33 end through a right segmented vent 57 in the lower portion of the step of the forward piece 67 of the enclosure 28.

Adjoining this first segmented vent 57 on its left 58 in the forward 33 most area of the lower part of the step of the forward piece 67 of the enclosure 28, and contiguous with the first segmented vent 57, is a second segmented vent 66 in communication with and alternating the direction of the fan 152 driven air flow through the first segmented vent 57.

The step shaped enclosure 28 is mostly sealed so that during embodiment operation, air is drawn into 74 and through the second vent 66, over the motor 24 and out 70 through the first vent 57 during ingredient mixing; and, when the motor is reversed, air is drawn into 71 and through the first vent 57, over the motor and out 76 through the second vent 66 during ingredient extrusion.

During both ingredient mixing and extrusion, air moved by the fan helps cool the circuit described earlier 244 (FIGS. 22 & 23) and the motor 24. The circuit 244 is mounted in the forward 33 lower step 67 of the step shaped enclosure 28 just behind the left vent 66 with its board positioned vertically and pointing fore 33 to aft 31 (FIG. 4). In this positioned it is in the air flow created by the fan 152 both during mixing and extrusion.

During ingredient extrusion, air exhausting 76 out the second vent 66 blows in a generally horizontal and downward direction helping to dry the ingredients which have been extruded. This is helped because exhausted 76 air has been warmed by passing over the motor 24 and circuit 244.

This reciprocating fan driven air movement is facilitated by the cylindrical fan duct 64 (FIGS. 3 & 4) which surrounds the perimeter of the fan blade 152 and connects air entering the fan blade solely and directly with the first segmented vent 57 and prevents air exiting the fan blade from reversing direction and reentering the fan blade until it has been exhausted 76 from the second vent 66 and performed its drying function. Having air movement created by both the first 57 and second 66 segmented ducts creates more air turbulence in the drying area just in front of the ducts 57 66 than a single air flow and thus enhancing ingredient drying.

Additionally, the air flow during extrusions partially pressurizes the enclosure 28 thus helping to prevent flour or other contaminants from entering it.

Air from the fan is blown directly onto the motor 24 during extrusion when the motor is experiencing heavy mechanical loads and needs cooling. Air is pulled over the motor 24 during mixing when mechanical motor loads are low and cooling is not as critical. The permanent magnet dc motor 24 is more efficient than universal motors commonly used in kitchen appliances and thus produces less heat and needs less cooling.

The aft plate of the motor frame is securely mounted to the forward facing flat wall of a rear facing open-box shaped molded gear housing 78 which in turn is rigidly connected to the rear piece of the enclosure 80 with four screws thus forming a fully enclosed rigid box. The rear piece of the enclosure 80 is mounted to the front piece of the enclosure 67 with an additional four screws thus forming the stepped shaped enclosure 28 which contains the aforementioned fully enclosed rigid gear housing box.

Within this fully enclosed gear housing box, the aft 31 end of the motor shaft 48 axially mounts a primary drive pinion gear 82 on a slip clutch formed by a ball bearing pressing against a "D" flat on the motor shaft with a set screw adjusted helical spring pressing against the ball. If too much torque is placed against the primary drive pinion gear 82, as an example if dry ingredients are mistakenly extruded, the ball bearing is forced upward by the flat on the motor shaft until it disengages the flat and allows the motor shaft to rotate within the pinion gear.

This type slip clutch is known in principle and has not been illustrated in detail for simplification of illustration. Such a slip clutch safety feature is important in a home food product mixer/extruder where tremendous structurally loads can damage the device if a simple mistake is made, such as extruding pasta flour before it is fully mixed with liquid.

Alternatively, the pinion gear 82 might be mounted in conventional manner directly to the motor shaft 48.

The primary drive pinion gear 82 meshes with a larger first intermediate gear which is rigidly and coaxially connected to another pinion gear which meshes with a second intermediate large gear, which in turn is rigidly and coaxially connected to another pinion gear which then meshes with a large final drive gear 84. The transmission is conventional and has not been shown in detail for simplification of illustration.

This cascading gear transmission, which is entirely disposed within the full covered box formed between the open box shaped gear housing 78 and rear piece 80 of the two piece enclosure 28, reduces the motor drive speed by about 100:1, or from a no-load motor speed of about 6,000 rpm to approximately 60 rpm. The gears in this embodiment are fully enclosed between the box shaped gear housing 78 and the rear 80 of the stepped shaped enclosure 28 and thus are kept from flour and other contamination which might shorten gear life.

Axle mountings for the two intermediate gears and the final drive gear are front 33 to back 31 within the full covered box are provided and are horizontally disposed between, and securely connected to, the inside face of the gear housing 78 and the inside face of the rear piece 80 of the two piece enclosure. Two metal plates mounted on each end of the axles and secured by four screws each to the gear housing and rear piece of the two piece enclosure respectively, help support the axles for the first and second intermediate gears.

The transmission is similar to those well known in the art and, therefore, detailed illustration has been omitted for simplification.

An alternative preferred embodiment transmission mounts an 8 degree helical pinion primary drive gear on the motor shaft. This gear is molded of acetyl resin and it meshes with a larger second helical gear made of nylon. The 8 degrees of helix substantially reduces gear noise in this high speed mesh, and greatly increases the strength of the gear mesh while simultaneously not significantly increasing axial thrust on the motor shaft which might shorten motor bearing life.

Use of an acetyl gear meshing with a nylon gear increases gear life and decreases gear noise.

The second gear has a pinion spur gear, gear three, concentrically molded with it. This gear three, occurring in a slower portion of the transmission, has no helical gear inclination. This increases transmission mechanical efficiency, while not significantly increasing gear noise.

Gear three meshes with a larger acetyl gear, gear four, which in turn has a small diameter 8 degree helical drive gear, gear five, concentrically and integrally molded at its center. Again the nylon gear, gear three, meshing with the acetyl gear, gear four, reducing gear noise and increasing gear life.

Finally gear five meshes with the large diameter nylon final drive gear 84, gear six. An 8 degree helix is used on the final drive gear to increase meshing strength and gear life.

This three mesh transmission using helical gears in its first and last mesh is felt to significantly increase mechanical efficiency within a small physical package while simultaneously minimizing gear noise. Specifically, the transmission simplifies the gear reduction task into three stages. Stage one, the high speed mesh from the motor to the first intermediate gear, takes high rotational speeds which normally cause significant gear noise and minimizes the sound through use of helical gear teeth made of dissimilar materials.

Stage two, the intermediate mesh, maximizes efficiency by using a straight spur gear mesh where gear sound is no longer a major factor due to reduced rotational speeds and where mechanical loads are still low thus not requiring gears with extraordinary strength.

Stage three, the final mesh, optimizes load transfer through use of helical gears.

Compactness, low noise, long life, and the ability to handle heavy mechanical loads are all qualities which are particularly important in a home food products mixer/extruder.

A horizontally disposed mixer/extruder drive shaft 86 couples to the large final drive gear 84 though a hexagonal hole 85 in the gear's center collaring a hexagonal portion of the shaft 86, see FIG. 3. Using a hexagonal drive shaft 86 engaging a hexagonal hole 85 gives adequate torsional coupling strength while insuring easy assembly by having engagement possible every 60 degrees of shaft rotation. Along with a tapered end to the drive shaft, the shaft may simply be shoved into the hexagonal hole in the final drive gear without resistance and it will simply rotate the 30 degrees or less needed to insert and couple it. This ease of assembly is particularly important in a home food mixer/extruder, which of necessity must have many assembled pieces.

The drive shaft projects directly and generally horizontally, forward 33, through a hole 88 in the forward piece 67 of the enclosure 28, and into a transparent molded polymeric mixing bin 22 which is cradled in the step 29 of the step shaped enclosure 28. This mixing bin 22 is generally rectangular in plan view and has: an open top; generally flat right 90 and left 92 and front 94 and back 96 (see FIG. 2) side walls; and a near half cylinder bottom wall 98 which is slightly inclined downward toward the front 33 of the bin 22 (see FIG. 3). Protruding from the front wall 94 of this mixing bin 22, and about ⅓ the diameter of the mixing bin's cylindrical bottom wall 98, and protruding about ⅓ the mixing bin's length into the front 33 of the mixing bin 22 and approximately concentric with the drive shaft 86 and cylindrical bottom wall 98 of the mixing bin and raised above the cylindrical bottom wall 98 of the mixing bin 22, is a cylindrical extruder housing 32.

Directly forward of the final drive gear 84 and mounted on the drive shaft 86 inside the mixing bin 22 on a cylindrical tubular shaft 100 which has a hexagonal center bore collaring and engaging a hexagonal portion of the drive shaft 86, is a set of radially disposed mixing and extruder feeding blades 102 104 106 108 110. A key slot 230 disposed off-center on one of the drive shaft's six flat hexagonal faces engages a molded in key rib 232 inside the hexagonal center bore of the mixing blade cylindrical tubular shaft 100 and locates the mixing blade, and won't allow it to be slid on the shaft backwards, and will allow it to be mounted to the drive shaft at only one angle relative to the extrusion screw. This eliminates the possibility of a user assembling the mixing blade on the drive shaft wrong. It also insures that the feed blades 108, 110, described later, will be automatically correctly aligned and timed to feed ingredients to the extruder screw 30 when the screw 30 is in a position most able to accept the ingredients. A home food products mixer/extruder must rely as little as possible on educating the end user for proper use and assembly.

The orientation between the mixing/feed blades 102, 104, 106, 108 and 110 and the extruder screw 30 is critical to optimizing the extrusion rate because if an edge on the extruder screw is crossing or blocking the extruder feed hole 158 it will have less tendency to accept ingredients than if a valley between the extruder screw threads is exposed in the feed hole 158.

Starting from the back of the mixing bin and moving forward, there are three straight relatively flat mixing blades 102, 104, 106 mounted orthogonal to the drive shaft's 86 axis of rotation. These blades 102 104 106, when turned by the motor/transmission driven drive shaft 86, rotate the outer tips of their blades in close proximity to the cylindrical bottom wall 98 of the mixing bin 22. Each mixing blade 102, 104, 106 is generally flat in cross section and angled from the drive shaft's 86 axis of rotation so as to propel ingredients in the mixing bin 22 forward 33, like a propeller, to the front of the mixing bin during ingredient extrusion. This propulsion of ingredients to the front of the mixing bin during extrusion is also aided by the position of each mixing blade. When the drive shaft 86 is rotating in extrusion direction 36, the rear mixing blade 102 strikes the ingredients first, followed by the middle mixing blade 104, and finally by the front mixing blade 106. This propels the ingredients from the rear mixing blade 102 to the middle mixing blade 104 to the front mixing blade 106 and thus from the back 31 of the mixing bin to its front 33.

Viewed from the side, the blades 102, 104, 106 each have a narrow, high aspect ratio, generally trapezoidal outline.

The first mixing blade 102 is positioned in close proximity to the flat rear wall 96 of the mixing bin. The next 104 is positioned about ½ the length of the cylindrical tubular shaft 100 forward of the first 102 and at 90 degrees counterclockwise rotation 34 from it when viewed from the front 33 of the drive shaft, and the third 106 is positioned at the forward 33 end the tubular shaft 100, just aft 31 of the back of the cylindrical extruder housing 32, and at 90 degrees counterclockwise rotation 34 from the second mixing blade 104.

These sequenced 90 degree mixing blade placements, as mentioned above, help move ingredients in the mixing bin 22 to the front 33 part of the mixing bin during ingredient extrusion. The configuration is also easily molded, as an example in plastic, without complicated molds.

Forward of these three mixing blades 102 104 106 and mounted integrally on the same tubular shaft 100, are a clearer blade 108 and an upper extruder feed blade 110. The upper extruder feed blade 110 is supported by an arm 112 which is also positioned near the front of the tubular shaft and at 90 degrees counterclockwise 34 rotation from the third mixing blade 106. This arm 112 is radially disposed and inclined forward 33 about 30 degrees off vertical toward the front 33 of the mixing bin. This inclined arm 112 projects the upper extruder feed blade 110 over the cylindrical rear portion of the extruder housing 32 which protrudes back 31 into the forward 33 portion of the mixing bin 22 coaxial with the drive shaft 86 and its collaring tubular shaft 100.

The upper extruder feed blade 110 is a narrow flat paddle inclined 5 degrees inward off radial disposition to facilitate the correct timing of dropping of mixed ingredients into the extruder feed hole 158. This blade's 110 outer edge, when rotated by the drive shaft 86, comes in close proximity to the cylindrical lower mixing bin wall 98 and its inner edge rotates at a distance substantially away from the rear projecting cylindrical extruder housing 32. The forward facing 33 tip of the upper extruder feed blade 110 is disposed in close proximity to the generally flat forward inside wall 94 of the mixing bin.

The clearer blade 108 is a straight rod-like projection which is mounted parallel with the drive shaft's 86 axis of rotation on another 30 degree off vertical forward 33 inclined radial arm 114 which is integral and positioned on the cylindrical tubular shaft 100 180 degrees opposite the arm 112 holding the upper extruder feed blade 110.

The clearer blade 108 rotates parallel to and in close proximity to the cylindrical outer wall of the extruder housing 32 and at a distance substantially away from the mixing bin's lower cylindrical wall 98. The forward 33 facing tip of the lower extruder feed blade 108 is also disposed in close proximity to the generally flat forward inside wall 94 of the mixing bin.

During extrusion the leading edge of the clearer blade 108 is parallel to the drive shaft's axis of rotation and is inclined like a road grader blade away from the extruder housing 32 to lift ingredients away from the cylindrical outer wall of the extruder housing 32 and away from the upper extruder feed hole 158 which the wall 32 contains so as to keep the feed hole 158 free of ingredients which might bridge the hole 158 over and interfere with the extruder's feed.

Disposed on the inside of the mixing bin's 22 generally smooth interior cylindrically shaped lower wall 98 are a series of discrete, separated, narrow, shallow, sharp, upward facing step shaped protrusions 116 which on their lower sides incline and blend into the mixing bin's 22 interior wall 98 thus forming projections with acute triangular vertical cross sections; and rectangular perimeter outlines when viewed in plan. These step shaped protrusions 116 help break up and mix the ingredients in the mixing bin when the mixing blades are rotated during either mixing or extrusion.

These protrusions 116 are felt to be novel. By having a plurality of steps, as opposed to say a single long step or no step at all as shown in previous art, two advantages are gained. First, ingredients, and particularly ingredients which become lumped together, are broken up a small step at a time, thus requiring less power than a system trying to break up ingredients over say a single long step or using the geometry of a smooth sided mixing bin.

Second, these small protrusions 116 reduce motor surging. Motor surging is where a motor suddenly slows down due to additional load, as an example caused when ingredients being pushed by the mixing blades hit a single long step or hit smooth sides on a mixing bin. Surging generally oscillates fast/slow/fast/slow . . . as the ingredients collide with a single step or mixing bin wall and then become free again. This surging strains all mechanical elements within the appliance and shortens motor and mechanical element life. The small protrusions 116 gradually break up ingredients literally a step at a time and thus significantly reduce motor surging and the damage it may cause.

Surging is also reduced by the disposition of the mixing and feed blades 102, 104, 106, 108, 110 on the cylindrical tubular shaft 100. All tall blades 102, 104, 106, 110, those blades that come into close proximity with the sides of the mixing bin, that includes all mixing and feed blades 102 104 106 110 except the clearer extruder feed blade 108, are disposed at least 90 degrees to one another. This helps prevent ingredients bridging between two tall blades as is the tendency of many ingredients. When such bridging occurs, it can also cause motor surging as clumped bridged ingredients collide with and become free of mixing bin side walls and any contours they might contain. Again, this reduction of surging might significantly increase the life of motor and mechanical transmission components.

The upper portion the mixing bin 22 is rectangular in horizontal cross section, with flat vertical walls 90, 92, 94, 96 capped by a detachable, hinged, molded, clear polymeric lid 118. This lid, across its top surface, is unequally bisected into left 120 and right 122 indented areas, along a line parallel with the drive shaft's 86 axis of rotation.

The larger right-hand 60 indented area 122 is surrounded by low vertical walls and has an interior inclined planar surface 124 sloping about 15 degrees off horizontal down to the right 60 with this planar surface penetrated for about half its width at its right-hand side by an open segmented grate 126. This inclined planar surface 124 and open segmented grate 126 allow flour or other solid ingredients, and/or viscous, or liquid ingredients to be poured, dumped or fed into the mixing bin 22 without opening the mixing bin lid 118 and without stopping the machine while also preventing fingers or hands from entering the mixing bin.

This segmented grate 126 is felt to be unique. Prior art in motor operated home appliances in this category do not show openings which allow the user to introduce solid ingredients, such as flour, into a mixing bin without opening the mixing bin lid.

This ability to add, as an example, flour to the mixing bin without opening the mixing bin lid is a major advantage. For instance, when mixing a pasta, a user frequently has to add more flour or liquid to bring the ingredients in the mixing bin to the proper consistency. Being able to add flour through the lid without stopping the mixing or opening the lid saves much time and allows a more precise method for obtaining the proper mix.

The smaller left-hand 58 indented area 120 has a "U" shaped trough 121 penetrated at its central base by a narrow slot 128 running fore 33 to aft 31 for most of the trough's length. The trough 121 and slot 128 allow liquid ingredients and somewhat viscous ingredients, such as eggs and oil, to be poured into the mixing bin through the mixing bin lid. The trough 121 and narrow slot 128 slow and distribute the entry of the liquid ingredients into the mixing bin.

Figure 17:
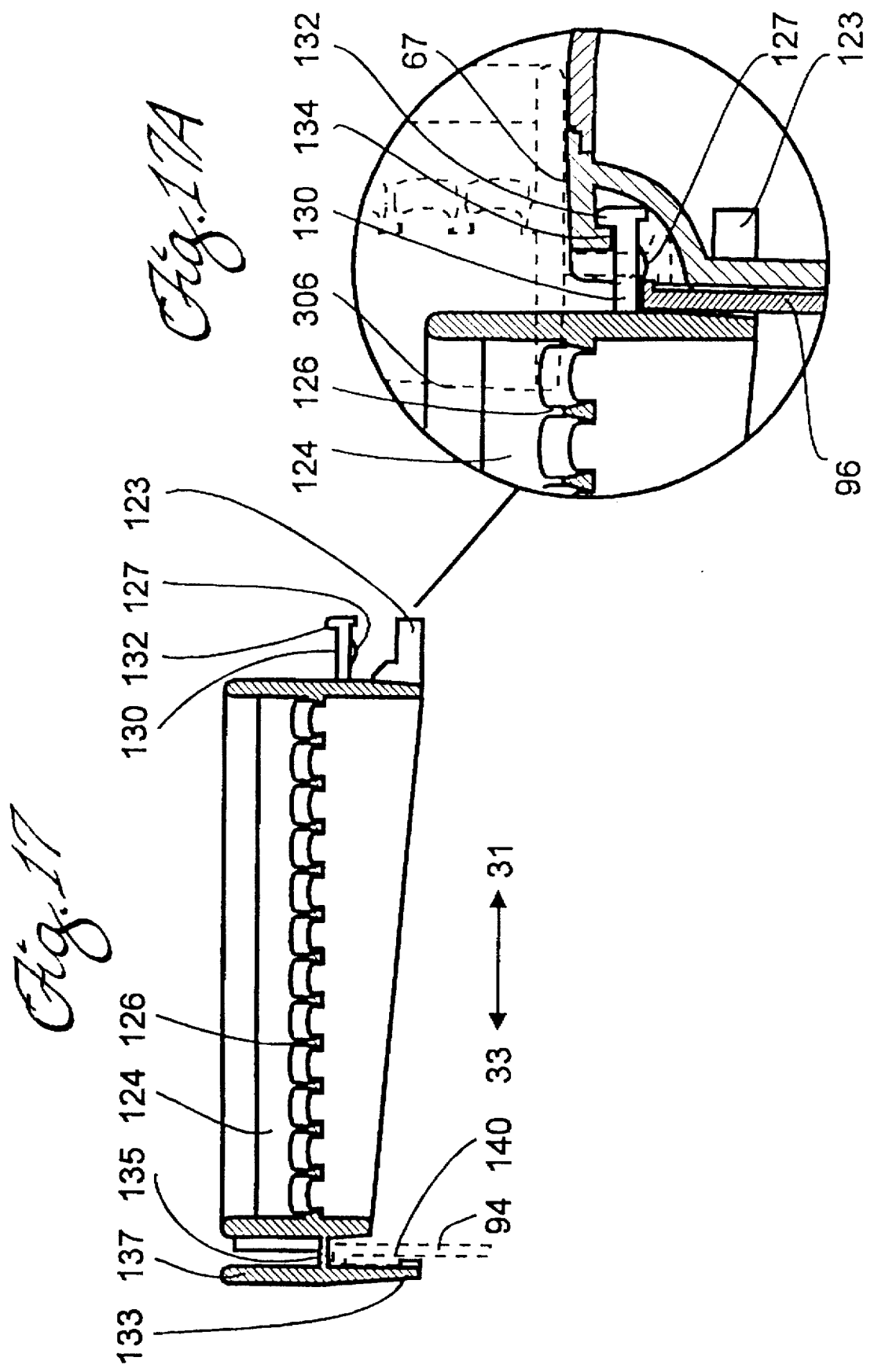
FIG. 17 is a section of the lid of the embodiment taken along line 17—17 in FIG. 1B.

Across most of the rear of the lid projects a rigid flat lever 130 which terminates along the full length of its back edge in an upward facing hook 132 which engages a reciprocal downward facing catch 134 in the top of the step shaped enclosure 67, 28 when the lid is closed on to the mixing bin 22—see FIG. 17A. This hook engagement securely couples the lid 118 and attached mixing bin 22 to the step shaped enclosure 28 when the lid is closed on the mixing bin as shown in FIGS. 3 and 17A. The hook engagement releases the mixing bin 22 from the step shaped enclosure 28 when the lid is opened as shown in the dotted lines 306 in FIG. 17A. Two small cams 127 on the bottom of the rigid flat lever 130 pull the lid to the back 31 of the mixing bin 22 when the lid is closing, making the lid engage correctly onto the mixing bin.

This is felt to be an advantage over other designs both because it allows the embodiment to be easily disassembled by simply opening the lid and then pulling off the mixing bin from the step shaped enclosure, and because it allows the bin 22 to be resecured to the stepped shaped enclosure 28 by simply closing the lid. It, in combination with the flat rib 148 on the lower front 33 of the mixing bin 22, also allows the mixing bin to be loaded either on a counter top or on the step shaped enclosure.

When opened 306 (dotted lines FIG. 17A), the lid 118 may rest in a vertical position on top of the step shaped enclosure as shown by the dotted lines in FIG. 17A. This allows easy access to the interior of the mixing bin without removing the lid from the stepped shaped enclosure 28. From this vertical position 306, the lid 118 may be easily lifted upward and detached clear of the enclosure 28 and mixing bin 22.

Thus this lid 118 design allows:

locking the embodiment's mixing bin 22 to its step shaped enclosure base 28 by simply closing the lid 118;

unlocking the mixing bin 22 from its step shaped enclosure base 28 by just opening the lid and sliding the mixing bin away from the base;

full access to the mixing bin's interior without removing the lid from the enclosure 28 and simply leaving it in a vertical position 306;

full removal of the lid by just opening it and lifting it free;

introduction of dry ingredients into the mixing bin 22 without opening the lid (by using the grate 126);

introduction of liquid ingredients into the mixing bin 22 without opening the lid (by using the slot 128).

Also projecting off the rear 31 of the lid 118, and positioned on both sides of the rigid flat lever 130, are two short vertical ribs 123 and 125. Both ribs project back 31 through holes 127 and 129 in the back flat wall 96 of the mixing bin 22, see FIGS. 14 and 17A, when the lid 118 is closed on the mixing bin, thus helping to hold the lid onto the mixing bin. These ribs couple to the mixing bin near the outer top corners of the mixing bin and provide, along with the front top corner mounted latches 133 described below, a closed box lid/mixing bin combination which is structurally resistant to the torque produced by the extruder 30. This rib 123 125 latch 133 combination is felt to be unique in that earlier appliances required heavy metal substructures to resist torquing forces. The right-hand 60 rib 123 is longer than the left 125, and when the lid is closed on the mixing bin, the right-hand rib 123 pivots through a hole 131 in the stepped enclosure, see FIGS. 11 and 17A, and contacts the safety interlock momentary-on microswitch (not shown), thus turning the motor off when the lid is opened and preventing a user from inadvertently being hurt by rotating mixer blades.

The front 33 of the lid has a molded on latch 133 comprised of a wide horizontal flexible flat rib 135 connecting the main front portion of the lid 118 to the middle of a wide vertical rigid flat rib 137 which has left 58 and right 60 rear facing projections 138 on the vertical rib's 137 outer lower front left 58 and right 60 edges which go over and in front of and engage forward 33 facing undercuts 140 disposed on the upper outer front edges of the mixing bin's 22 generally flat outer front wall 94 when the lid 118 is closed on the mixing bin 22 thus latching the lid 118 to the mixing bin 22. This latch 133 is opened by moving the top edge of the wide vertical flat rib 137 backwards 31 with finger pressure which in turn rocks in teeter-totter fashion the latch projections 138 on the fulcrum of the flexible flat rib 135 out of engagement with the mixing bin's upper front edge undercuts 140. The natural resilience of the polymeric flexible flat rib acts as a spring to reengage this latch when the lid is closed on the mixing bin. A polymeric material such as polycarbonate is suitable to bias the flexible flat rib 135 so this latch reliably engages.

Polycarbonate is also able to take high temperatures such as are found in kitchen dishwashers, and it provides high structural strength, so it is suitable for not only the lid (transparent, dishwasher safe, structural and spring latch), but also for the mixing bin (transparent, dishwasher safe and structural) and extruder housing (transparent, dishwasher safe and highly structural) as well.

In the center and bottom of the latch's 133 vertical rib 137 is a tab 240 which, when the lid 118 is lowered, engages into a groove 242 on the large vertical circular disc 162 which holds the extruder housing 32 and which comprise a large portion of the forward 33 wall of the mixing bin 22 (see FIG. 4). This engagement between the tab 240 and groove 242, coupled with the bayonet latches 164 on the disc 162 and mixing bin 22, locks the disc 162 to the mixing bin 22 when the lid 118 is lowered.

A tremendous amount of torsional force is carried by the mixing bin 22 in the embodiment between where it engages the step shaped enclosure (through pins 143 and 141 and projection 146) and where it engages the extruder housing 32 (through bayonet latches 164). This torsional force is generated by torsional force at the back of the drive shaft being opposed by extruder screw resistance in the extruder housing during extrusion. As mentioned earlier, by being disposed at the upper outer corners of the mixing bin, the above described latches 133 rigidize the mixing bin when the lid is closed so the mixing bin acts as a stressed skin closed box, a structure particularly well suited to taking the unusual tortional loads of this particular home appliance embodiment. This lid/mixing bin engagement is different from other similar appliances which rely on less reliable center latches which allow comparably far more undesirable flexing in the mixing bin 22 than the structure just described.

The mixing bin 22 on both the upper left and upper right sides of its flat rear wall 96 has two rear facing cylindrical pins 141 and 143 which engage holes 145 and 147 in the stepped shaped enclosure 28. Additionally the enclosure has a forward 33 facing shallow cylindrical projection 146 surrounding the drive shaft 86 entry 85 into the mixing bin 22. This shallow projection 146 engages a hole 149 penetrating the flat rear wall 96 of the mixing bin (FIGS. 11 & 14). For further rigid engagement between the mixing bin and the stepped shaped enclosure, there is a vertical rib 148 projecting from the lower front section of the mixing bin. This rib 148 is pierced by two holes 151 and 153 which engage pins 144 molded into the stepped shaped enclosure 28. This combination of holes 145 147 149 151 153 and pins (projections) 141 143 144 146 rigidly secure the torque resistant closed box mixing bin structure to the torque resistant double closed box structure of the stepped shaped enclosure 28 encasing the gear housing 78. This is again a departure from earlier designs for, as an example, pasta makers, which didn't use the essential elements of the mixing bin and motor and gear enclosures as major structural elements. This in turn meant earlier designs were larger and heavier which is very undesirable in a kitchen appliance which must be moved and stored.

The front 33 of the drive shaft 86 has a helical auger extruder screw 30 integrally coaxially molded. This screw 30 is disposed within the interior 308 of the generally cylindrical molded polymeric extruder housing 32. The extruder housing 32 in turn projects partially back 31 into the mixing bin, coaxial with the drive shaft 86, and partially forward 33 out in front 33 of the mixing bin 22.

Figure 7:
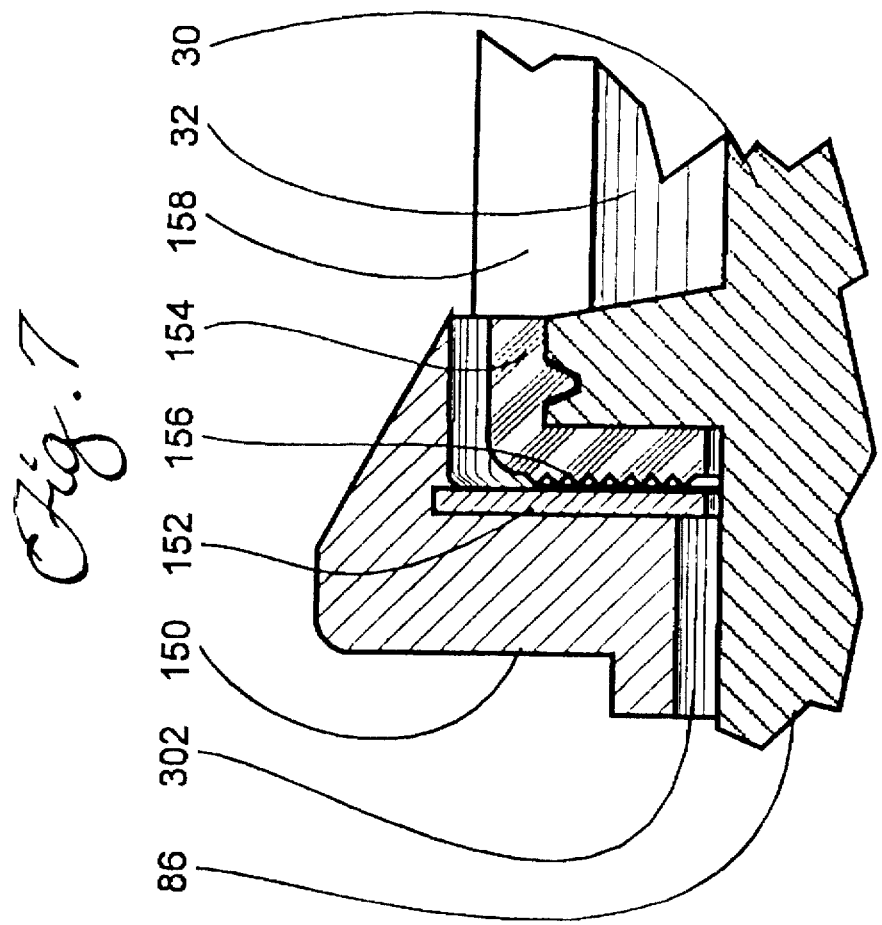
FIG. 7 is a sectional view of the bearing washer shown in FIG. 6 as well as portions of components surrounding the washer.
Figure 6:
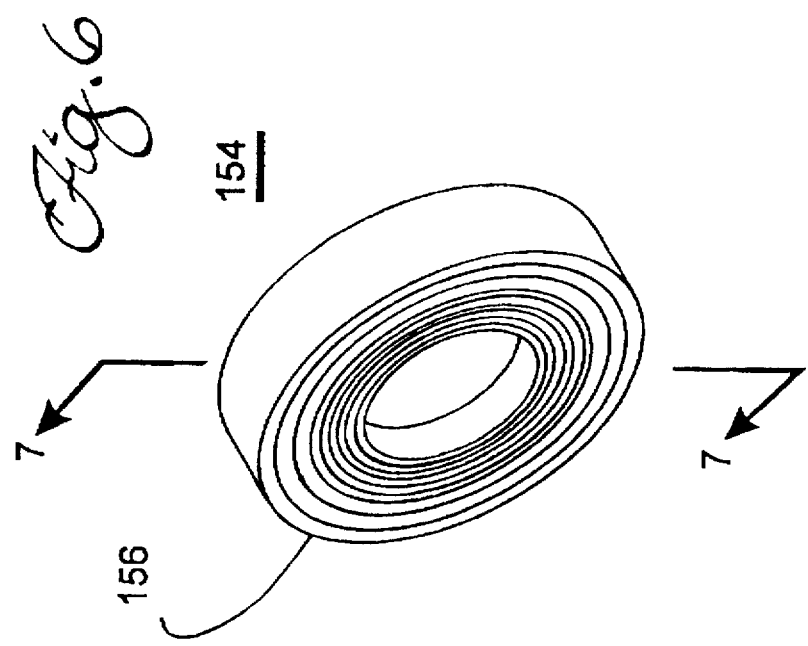
FIG. 6 is a perspective view of a bearing washer 154.
Figure 9:
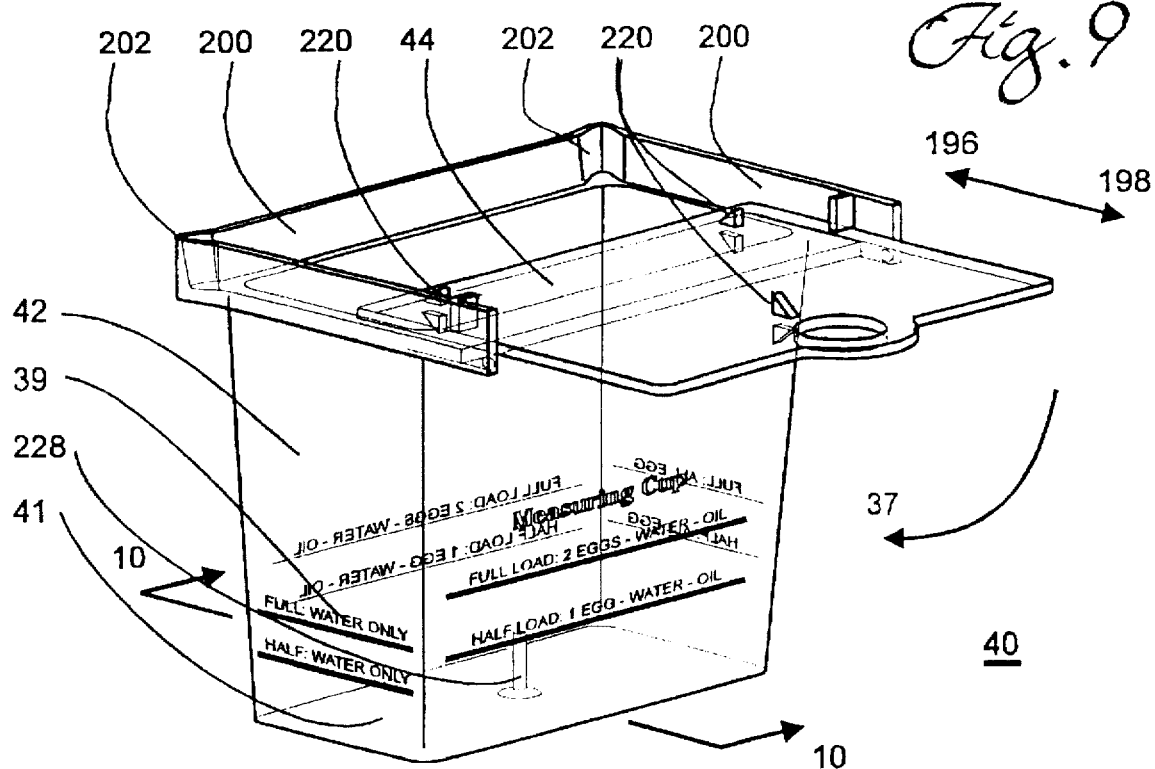
FIG. 9 is a perspective view of a measuring cup.

The rear 31 of the extruder housing 32 which is disposed within the bin 22 is capped at its back with an integral vertical wall 150 having a central hole 302 through which the drive shaft 86 passes. In order to form a thrust bearing surface, where the rear of the extruder screw contacts this rear vertical extruded housing wall, there is a stainless steel washer 152 insert molded to the extruder housing's rear vertical wall 150 and a plastic bearing washer 154 snapped on the back of the extruder screw 30 (FIGS. 3 & 7).

This plastic bearing washer 154 has densely packed bulls-eye-like concentric grooves 156 in its rear 31 flat surface which contact the metal washer 152. These grooves 156 provide clearance for dry contents which might leak into the bearing area and get trapped between the two bearing surfaces 152 154. The grooves 156 are felt to be novel and substantially reduce both bearing wear and bearing noise in the dirty, dusty environment found within the mixing bin 22.

The stainless steel washer 152 both is frictionally compatible with the plastic bearing washing to provide a suitable bearing surface (as an example between acetyl for the plastic washer and the stainless steel for the metal washer), and helps to conduct away and dissipate heat which might otherwise build up in the bearing. Stainless steel is resistant to corrosion and expands relatively little when heated by bearing forces, thus making it further suitable.

The portion of the cylindrical extruder housing 32 which is disposed within the mixing bin 22 is penetrated by an upper extruder feed hole 158 and a lower extruder housing clearing hole 160. The larger upper extruder feed hole 158 is generally rectangular in plan view and penetrates the upper cylindrical wall of the extruder housing 32 symmetrically through about 90 degrees of wall arc. The extruder feed hole 158 is open for most of the length the extruder housing 32 is within the mixing bin. During extrusion, ingredients to be extruded may drop to the interior of the extruder housing 32 through this upper extruder feed hole 158.

The smaller lower extruder housing clearing hole 160 is also rectangular and is open through about 30 degrees of extruder housing wall arc in the lower most section of the extruder housing 32. The lower clearing hole 160 runs only about ⅓ of the length the extruder housing is within the mixing bin, with the clearing hole's 160 back 31 edge directly below the back 31 edge of the helical extruder screw 30 and forward 33 of the bearing 154 on the back of the extruder screw 30 (see FIG. 3).

During mixing, the extruder screw 30 moves materials to the rear 31 of the extruder housing 32 where they are cleared out of the extruder housing mostly through the lower clearing hole 160. This helps prevent the collection of dry flour in the extruder housing during mixing. Contrary to what logically might be expected, the lower cleaning hole 160 does not substantially reduce efficiency of the extruder feed mechanism because ingredients falling next to the extruder screw are forced forward by the screw's 30 threads.

It is felt that this hole 160 is both novel and effective in making a simple extruder system.

The extruder housing 32 is integrally molded into a large vertical flat circular disc 162 which rotationally mounts 36 and dismounts 34 to the generally flat mixing bin front wall 94 through three symmetrically space bayonet type latches 164 on its perimeter which cooperate with grooves 165 and stops 167 on wall 94. Within these grooves 165 are projections 236 which engage detents 238 on the bayonet latches to allow the latches to engage and couple in only one rotational orientation (one position in 360 degrees of arc).

The flat disc 162 and the extruder housing 32 it supports form much of the front 33 interior wall of the mixing bin.

On the inside wall of this disc 162 facing into the mixing bin 22, there is molded a rod-like clearing projection 166 pointing directly back 31 toward the rear of the embodiment (see FIGS. 2, 3, 12 and 13). The left-hand 58 leading edge 34 of this cleaning projection 166 comprises a vertical wall disposed almost over, and a moderate distance from, the right-hand 60 edge of the extruder feed hole 158.

The projection's 166 position is such that when the drive shaft 86 is rotated 34, 36, the lower edge of the upper extruder feed blade 110 passes above and in close proximity to the upper edge of the clearing projection 166, while the upper edge of the clearer blade 108 passes below and in close proximity to the lower edge of the clearing projection 166. During such rotation the rear 31 facing tip of the clearing projection 166 comes in close proximity, but does not touch, the arms 112 114 holding the upper extruder feed blade 110 and clearer blade 108. The projection 166 reduces the amount of ingredients that may collect on the clearer 108 or upper 110 feed blades by scraping their upper and lower edges respectively. The scraped dough either then drops into the extruder hole 158 or back into the mixing bin.

This arrangement of a clearer blade 108 and an upper 110 feed blade orbiting inside and outside respectively a cleaning projection 166 is felt to be novel. Earlier designs have used a large single paddle to lift ingredients into an extruder feed chamber entrance. Such large single paddles tend to build up ingredients on their faces and thus become clogged and ineffective. By contrast, the small paddle surface on the upper feed blade 110 has far less tendency to build up ingredients on its paddle surface. The cleaning projection 166 tends to clear excess ingredients from the upper feed blade as well. The clearer blade 108 provides the benefit of clearing any ingredients which might bridge over extruder feed hole 158 or collect on the cleaning projection 166. This is a major advantage as ingredients frequently tend to bridge over feed holes and block the feed of the extruder.

During both mixing and extrusion, ingredients in the bin 22 are mixed by the mixing and extruder feed blades 20 rotationally 34, 36 passing through the ingredients and by the ingredients being pressed and shredded by the mixing and extruder feed blades 20 against the mixing bin's side walls and stepped shaped protrusions 116 thereon.

During extrusion, ingredients in the mixing bin 22 are moved toward the front 33 of the mixing bin 22 by both the propeller-like mounting angle of the flat mixing blades 102, 104, 106 to the tubular shaft 100 and by the mixing blades order of progression along the cylindrical tubular shaft 100.

At the front end 33 of the mixing bin 22 the ingredients are lifted by the upper extruder feed blade 110 from the mixing bin 22 to above the extruder feed hole 158. Most ingredients here naturally drop off the upper extruder feed blade 110 either into the extruder feed hole 158 or back into the mixing bin. Yet other ingredients may stick to the extruder feed blade 110.

As the upper extruder feed blade 110 continues around 36, it passes parallel to and in close proximity to the rod-like clearing projection 166. As it passes, excess ingredients are scraped off the extruder feed blade 110 by the rod-like clearing projection 166 and then these scraped ingredients may fall into the extruder feed hole, or fall back into the mixing bin, or they stick to the rod-like clearing projection. As the extruder feed blade continues yet further, it passes the bottom of the mixing bin 98 where it scrapes off ingredients stuck to it and picks up more ingredients and repeats the cycle. The step shaped protrusions 116 on the cylindrical bottom wall 98 of the mixing bin help in this by tearing and mixing the dough or ingredients passing on the upper extruder feed blade.

Ingredients which get stuck to the rod-like projection 166, as well as ingredients which become bridged over the extruder feed hole 158, may be cleared by rotation 34, 36 of the clearer blade 108. As the clearer blade 108 rotates 36 it passes just above the extruder feed hole 158 and just below the rod-like projection 166 and tends to clear them both and drop ingredients back into the mixing bin 22 or into the extruder feed hole 158.

This method of dough delivery works as a general rule at all levels to which the bin 22 may be filled. However, when the embodiment is processing a full load of dough, because the bin may be full above the drive shaft 86, for about the first half of the extrusion of the load, the extruder feeding blades 20 may rotate a large mass of dough around the extruder housing and its feed hole 158 and fill the extruder housing 32 completely with dough, even to the extent where dough falling into the feed hole 158 is pushed back out of the hole 158 by extruder screw 30 rotation 36. As the load empties, progressively less dough may be fed into the extruder feed hole 158 particularly as the bin becomes near empty and the upper feed blade 110 must reach to the bottom of the bin 22 and lift the dough through almost 180 degrees of arc to dump it into the hole 158.

During ingredient mixing, ingredients may also enter the extruder feed hole 158. These ingredients may be cleared from inside the extruder housing by a combination of the rotation of the extruder screw 30 moving ingredients to the back 31 of the extruder housing 32, and the extruder clearing hole 160 allowing the ingredients to drop back into the mixing bin 22.

During ingredient extrusion, ingredients enter the extruder feed hole 158 and are propelled toward the front 33 of the extruder housing 32 by the rotating extruder screw 30 where they are then compressed against the extrusion die 38, worked to a malleable consistency, and pressured through the die's 38 openings 168. Four long shallow troughs 170 (see FIG. 8) in the front 33 half of the interior wall of the extruder housing 32, and running parallel with the mixer/extruder drive shaft's 86 axis of rotation, help the extruder screw 30 build ingredient pressure against the extruder die 38. These troughs 170 are radially disposed on the sides facing clockwise 36 extruder screw 30 rotation and are ramped at 45 degrees to radial on the side facing counter-clockwise 34 extruder screw 30 rotation. This helps prevent pressure on the extruder screw during mixing due to dry flour pressing against the step. Its ramped troughs also provide an additional measure of safety against a finger being pinched if someone should accidentally leave off the extrusion die and put their finger into the extruder screw during mixing.

The cylindrical interior of the rear 31 half of the extruder housing is smaller in diameter than the forward half and smooth with no steps. This also helps reduce pressure on the extruder screw during mixing. Also, the thread on the rear of the extruder screw does not extend all the way to the back of the extruder housing but instead dead ends at the thrust bearing washer 154. This is yet another way of reducing pressure on the extruder screw during mixing.

Capping the front of the extruder housing 32 is a threaded die nut 172 capturing a circular disk extrusion die 38. A plurality of female buttress threads 174 (FIGS. 3 & 3A) on the inside of the die nut 172 hold the die nut in engagement with male buttress threads on the outside of the front of the extruder housing. Castellated indents 176 on the forward perimeter of the die nut provide engagement for a wrench if the die nut becomes stuck or is tightened too tight onto the extruder housing. Motor reversal may also be used to lower pressure on the die nut and make it easier to remove. Motor reversal may also be used to reduce pressure against a die and allow it to be changed for one of another shape during extrusion.

An inward projecting lip on the front face of the die nut 172 engages and captures the outer perimeter of each circular extrusion die.

Two cylindrical tubes 178 180 are integrally coupled parallel with the drive shaft 86 axis on the right 60 side of the die nut 172. An "L" shaped molded cutter blade 46 easily snap fits into and out of and rotates 34 36 in either of the holes in the center of each of the cylindrical tubes 178 180. This blade 46 has an elongated flat surface which parallels the front surfaces of the extrusion dies 38 when the cutters and dies are both mounted to the embodiment. This blade 46 has sharp edges on both sides, and has a small finger handle 182 which permits the blade to be rotated 34 36 by hand across the front 33 face of each extrusion die 38 contacting and scraping the die's front surface across the blade's length thus cutting material extruding through the die holes 168. One of the tubes 180 is longer and disposed above and parallel to the other tube 178 and permits use of the cutter 46 with deeper (thicker) dies such as those used to make macaroni. This cutter blade 46 is free to rotate a full 360 degrees which makes it easy to cycle from cut to cut.

Each extrusion die 38 is penetrated front to back by one or more holes 168 shaped to produce various cross sections of extruded material. As an example, a spaghetti extrusion die might have 30⅛ inch diameter holes spaced on about ¼ inch centers.

Extrusion dies 38 may have holes 168 with cross sections comprising a forward 33 segment having parallel or outwardly divergent walls 184 for at least 0.010 of an inch and a widely taper rear segment 186 with walls angling at least 20 degrees off the hole's center axis (see FIGS. 3 & 3A).

This construction differs from conventional die configurations and promotes both easy cleaning due to the high rear hole taper, and intermittent extrusions without intervening cleanups because material drying in the front of the die may be easily extruded through the die due to the parallel or outwardly divergent wall construction in the forward 33 die hole segment.

The dies are subjected to tremendous pressure during extrusion. Interlocking annular projections on the forward 33 outer perimeter of each die 188 (FIG. 3A) and on the rear inner perimeter of the die nut center hole 190 engage each other to lock the die in place during extrusion. This differs from past die constructions which have no such interlocking.

During extrusion pressure on the die 38 from material to be extruded pressing against the die 38 may make the die nut 172 difficult to unscrew. The cutter tubes and their support help give leverage to unscrew the die nut. In addition, a wrench is provided with the embodiment to facilitate removal of the die nut 172. Also, the embodiment may reverse its motor rotation direction to the mix mode and thus lower the pressure on the die nut by reversing the direction of rotation 34 of the extruder screw. This reversing action makes removal of the die nut much easier.

To measure powder, liquid and other materials being placed in the mixing bin, a measuring cup 40 is provided. This cup is rectangular in plan view with transparent generally vertical side walls 42 which are marked 39 with horizontal lines and wording for measurement of ingredients, and a guillotine lid 44 which slides horizontally in from the side to both automatically and accurately level measured materials and to make possible dumping materials into the mixing bin either through the segmented grate 126 in the right-hand side of the lid 118 or directly into the uncovered mixing bin 22. The cup 40 has a low wall 200 above the lid 44 which prevents the excess flour or other measured materials from dumping off the cup when the lid is closed.

Figure 19:
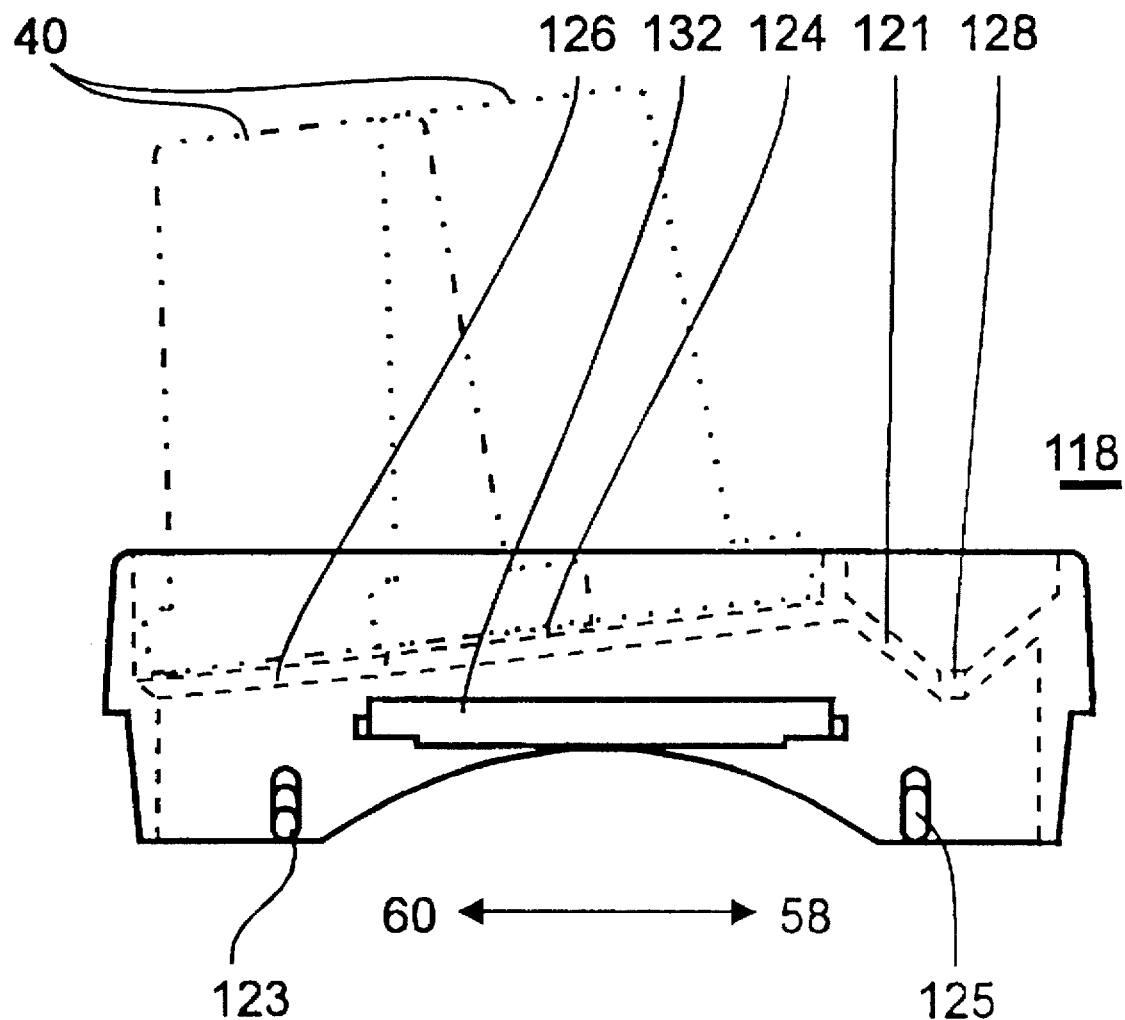
FIG. 19 is a rear elevation of the lid shown in FIG. 17
Figure 20:
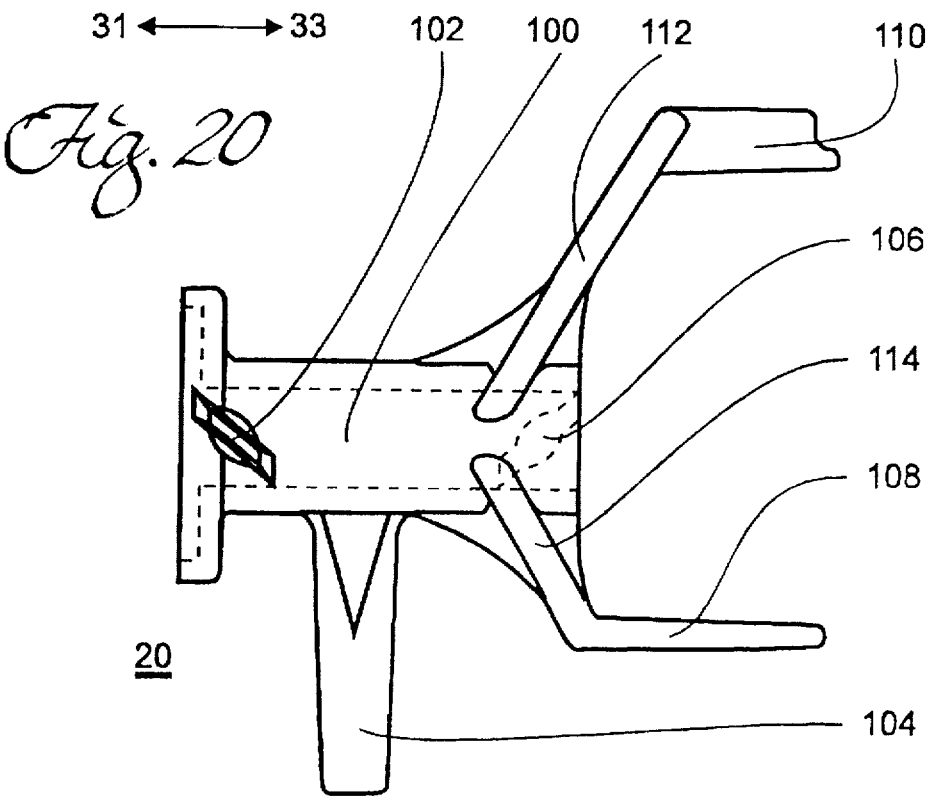
FIG. 20 is a side elevation of the embodiment's mixing blade.
Figure 21:
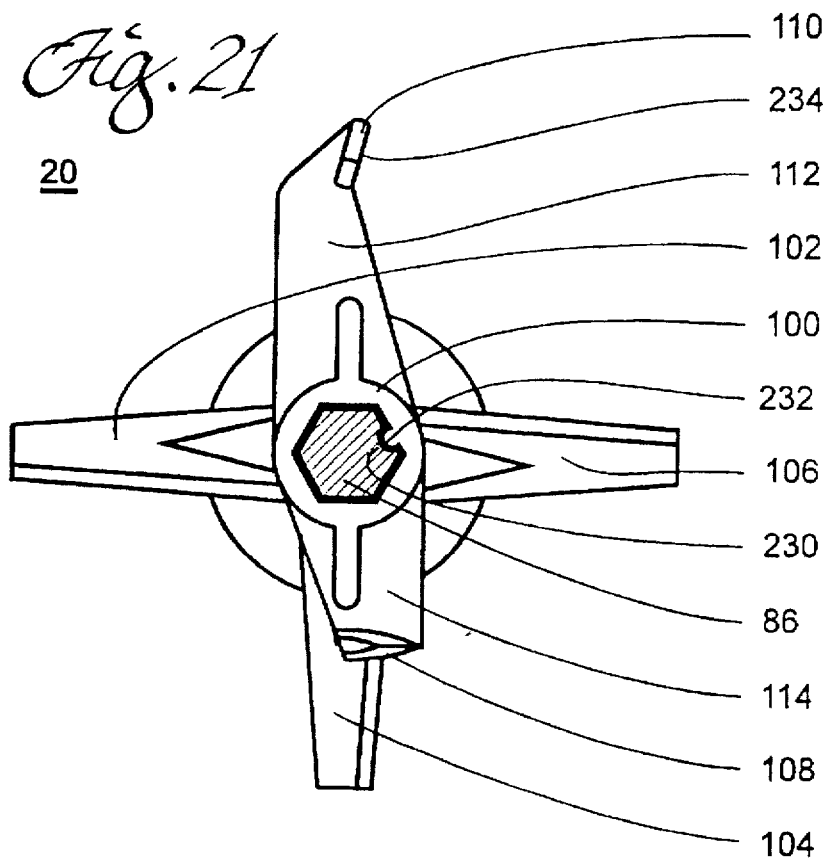
FIG. 21 is a front elevation of the mixing blade shown in FIG. 20.

One method to dump materials measured in the measuring cup 40 directly into the mixing bin 22 with the mixing bin lid closed (see FIG. 19) is, the materials are first poured into the measuring cup 40 and the measuring cup's lid 44 is slid 196 to its closed position and the excess materials are poured back into their storage container. The closed measuring cup is then inverted and placed onto the right 60 side 122 of the mixing bin lid 118 with the handle on the measuring cup lid pointing to the left 58 or uphill side of the mixing bin lid. The lid of the measuring cup is then slid open 198 and the measuring cup shaken left 58 and right 60, and/or fore 33 to aft 31 to help sift the materials through the holes in the grate 126 on the right side of the mixing bin lid. This shaking action is possible because the inclined planar surface 124 on the mixing bin lid's right 60 side is larger than the perimeter of the top of the measuring cup and thus allows room for the cup 40 to be shaken both right 60 to left 58 and fore 33 to aft 31. Some materials, such as sugar or durum flour may not require this shaking action.

The measuring cup 40 also has pouring spouts 202 formed in two forward upper corners by the thinned side walls. These prevent dripping and help in easily pouring liquid into the machine either with the lid open or closed. The measuring cup's lid 40 has stops 220 which prevents the lid from being accidentally removed from the cup but allows the cup to be fully opened with the lid still mounted to the cup. The lid 44 may be disengaged from the cup 40 by a firm pull 198 in combination with slight flexing of the lid 44.

The double-pull-double-throw three position forward-off-reverse switch 50 has a safety push button 204. The switch is comprised of a three position, center off slide switch with a flexing molded rib 204 integral to the rear piece 80 of the two piece enclosure 28 and disposed orthogonal to the wall from which it projects and directly beside the switch's slide lever 206 (FIGS. 1 & 1A).

The flexing portion 208 of the rib 204 is simply a place where the material forming the rib is thinned. It is located at the rib's base parallel with the wall from which the rib projects and allows the top portion of the rib to flex away 210 from the switch slide while the bottom of the rib closest to the wall from which the rib projects remains next to the switch slide. The flexing molded rib has a tapered catch 212 close to its top which is positioned to prevent the switch from being moved from its off position to its extrude position without the rib being deflected 210 by finger pressure to one side away from the switch slide 206. This tapered catch 212, however, because of its position and taper in direction of the switch slide travel, does not interfere with the switch being moved from its off 214 to its mix 216 position or vise versa or from its extrude 218 to its off 214 position.

This stop at the off position of the double-pull-double-throw three position forward-off-reverse switch 50 helps prolong the lives of the motor 24, switch 50 and other electrical and mechanical embodiment components. This is especially true because the three position switch 50 is switching large amounts of dc current which puts very high stresses on switching components, and because the permanent magnet dc motor 24 needs to be very large to supply the torque needed, as an example, to extrude pastas, and thus encounters very high mechanical and electrical stresses particularly, as an example, when it is switched too quickly from forward to reverse rotation or when it is extruding thin pastas. Such mechanical and electrical stresses are not common in kitchen appliances and thus the finger activated intermediate stop means provides a feature not commonly needed in kitchen venues.

Another alternative to this three position switch is an electronic control circuit which may switch the unit to mix and then to extrude and then off at either preset or user set intervals. Such electronic control systems are today used in such appliances as bread and dough makers.

In operation this preferred embodiment is easy to use. As an example, to make spaghetti the following could occur. Flour would be poured into the measuring cup 40 until the cup was slightly over full. The cup would then be tapped on the counter top to lightly pack it. Flour over the measured amount would be removed from the cup by sliding 196 the cup's flat lid 44 closed, thus closing the cup and leaving excess flour on top of the cup's lid surrounded by the low walls 200 projecting above the lid 44 of the measuring cup. The excess flour would then be poured back into its storage container by inverting the cup over the container with the cup's lid 44 still closed 196.

The flour remaining in the cup would then be dumped into the bin either by opening both the cup's and the bin's lids and pouring the cup's contents into the bin, or by inverting the cup onto the right side 122 of the closed bin lid 118 with the cup's lid 44 handle pointing left 58, opening the cup by sliding 198 its flat lid 44 sideways, and repeatedly sliding the cup across the lid left to right and/or fore to aft over the segmented grate 126 in the right side of the lid. This repeated movement sifts the flour through the segmented grate into the mixing bin.

Generally, before liquid is added to the mixing bin, the embodiment's motor is turned on to the mix direction by closing the mixing bin lid 118 and sliding the double-pulldouble-throw three position forward-off-reverse switch 50 up to the mix position 216. Water, eggs and possibly other liquid ingredients such as vegetable juices or spices are then poured into the measuring cup to the desired measuring height marked on the side walls of the cup. The contents of the measuring cup are then poured into the mixing bin either through the segmented grate in the right-hand side of the mixing bin lid 122 or through the slot 128 in the trough on the left-hand side of the mixing bin lid.

After 30 seconds to 5 minutes the ingredients in the mixing bin may be fully mixed. This is generally faster than most pasta makers because of the mixing blade configuration and because of the shallow steps 116 on the interior of the bottom wall of the mixing bin which help tear and mix the ingredients.

During mixing and extrusion it may be necessary to add either dry or liquid ingredients to the mixing bin to make a correct mixture. The segmented grate 126 on the right-hand side of the mixing bin lid 118 and the slot 128 in the trough on the left-hand side of the mixing bin lid allow such ingredients to be added without opening the mixing bin lid and thus without interrupting the mixing. Alternatively, the lid 118 may be opened to add ingredients.

The transparent mixing bin and mixing bin lid are very important in allowing the user to view the ingredients being mixed to determine that the mixture is correct, or what is needed to make it correct.

After the ingredients are mixed, the three position forward-off-reverse switch 50 is then switched down to its extrude position 218 by pressing down on the switch lever with a finger and simultaneously with the same finger or another finger pressing against the adjacent flexing rib 204 to release the safety catch 12 and allow the switch lever to move into the extrude position 18.

The catch 212 thus prevents the switch from moving unchecked into the extrude 218 position. It thus aids in delaying the switch in its off position 214 to allow the motor to slow before being reversed. This in turn helps prolong motor and other component life.

During extrusion, ingredients are further mixed and moved to the front of the mixing bin by a combination of the propeller-like mixing blade 102 104 106 mounting angles and their placement along the tubular shaft 100, and by the downward sloping cylindrical lower wall 98 of the mixing bin 22 (FIG. 3). The ingredients are then lifted and, dropped into the extruder feed hole 158 in the top of the rear half of the extruder housing 32 by the upper extruder feed blade 110 and clearer blade 114, and moved and pressured through the extrusion die 38 by the auger extrusion screw 30.

After the ingredient mix passes through the die 38 it can be cut by repeatedly rotating the cutter blade 46 in front of the die 38. After all the ingredients are extruded and the mixing bin is near empty, the embodiment is turned off by pushing three position forward-off-reverse switch 50 up to its off position 214.

In some cases it may be advantageous to tip the embodiment forward so it rests on its forward two support feet 222 and the lower forward lip 224 of the front piece 67 of the two piece step shaped enclosure 28 (FIGS. 3 & 4). The embodiment is balanced on the table or counter top 226 to be at stable rest in this forward tipped position and it, through its design form, provides a solid support base in this tipped position (FIG. 3).

This forward tip position also allows the embodiment to extrude pastas and other foods which don't extrude easily through a vertical extrusion die plate. These pastas include corkscrew-like rotini and fuscili as well as thick forms such as cookies and thick pie crusts among others. This forward tip position may also help in fully clearing the contents from the mixing bin by moving bin contents, and particularly wet or sticky contents, to the front of the mixing bin where they can be picked up by the extruder feed blades. The embodiment may also be tipped to this forward position with its die disposed over the edge of a counter or table to help in either extruding or clearing the mixing bin.

Additional pasta can be made without intervening cleanup by adding more flour and liquid to the mixing bin either immediately or up to one or two hours later, and repeating the above process. This repeated mixing is possible because pasta dough which may dry in the front of the die holes may be easily extruded through the forward portion of the die holes which have either no taper or an outward tapered. Effectively this give this embodiment unlimited capacity, a major competitive advantage.

Also, the slot 128 in the left-hand side of the mixing bin lid and the segmented grate 126 in the right-hand side of the mixing bin lid allows ingredients to be added to the mixing bin without even opening its lid or turning off the embodiment.

Cleaning the mixing bin and extruder is done by disassembling the embodiment. To do this the lid 118 is opened and then lifted out of engagement with the mixing bin by rotating the lid to its vertical position where it is out of engagement with step shaped enclosure and lifting it straight up away from the enclosure. The mixing bin is then pulled forward and uncoupled from the stepped enclosure by pulling on the rib 148 near the bottom from the mixing bin and simultaneously pushing on the pins 144 that pass through the rib.

The extruder housing 32 and integral disc 162 are then disengaged from the mixing bin by rotating it counterclockwise 34, thus uncoupling its bayonet latches 164, and pulling the housing away from the mixing bin. The mixing blades 20 are then slid backward off the drive shaft 86. After the die nut 172 is unscrewed 34 and the die 38 is pulled off, the extruder screw 30 and integral drive shaft 86 is pulled forward out of the extruder housing 32. This renders all cleanable parts disassembled and ready for cleaning. Other orders of disassemble are also possible and would be obvious to a user even after short experience with the embodiment.

Reassembling the unit is done by reversing the above process.

Many foods can be made with the embodiment described including: all kinds of pastas such as rotini, macaroni and spaghetti; cookies such as peanut butter and gingerbread cookies; pastries such as pie crusts; baked goods such as brownies, bagels and biscuits; and hors d'oeuvres such as chicken or beef meat balls and cheese dips. Most of these are made with recipes well known in the art with slight modification to accommodate rotary mixing and subsequent extrusion.

The structure of the embodiment is unique. A high degree of stiffness is required to insure integrity under heavy loads caused by mixing and extrusion. To achieve this, the embodiment comprises two enclosed box sections. The first is formed by the two halves 66 80 of the stepped shaped enclosure 28 joining. The second enclosed box section is formed between the rear piece 80 of the stepped shaped enclosure and the open box shaped gear housing 78. Both these formations are stress skin structures which give excellent stiffness and structure to the embodiment.

Flour, liquid and other contaminants can clog gears and shorten component life. The embodiment has its gears disposed within a sealed compartment formed between the rear piece of the stepped shaped enclosure 80 and the open box shaped gear housing 78. This eliminates contaminate exposure to the gears. The motor 24 and switches are enclosed within the stepped shaped enclosure 28. Openings into this area are limited to vertical surfaces to minimize contaminate entry.

The embodiment may be made at any convenient scale. As an example, the mixing bin may be approximately 6 inches wide, 6 inches deep and 6 inches high. The stepped shaped enclosure may be of any size to fit an appropriate motor and transmission.

Also the embodiment may be made of any of a variety of materials such as: polycarbonate for the extruder housing, lid and mixing bin; ABS for the stepped shaped enclosure, gear housing and die nut; and acetyl resin for the dies, extruder screw and mixing blades.

Various changes and modifications to the preferred embodiments will be apparent to those skilled in the art. Such changes and modifications may include, but are not limited to: using more or fewer mixing blades or changing their shape or layout; reversing the fan air flow; eliminating the trough on the left-hand side of the mixing bin lid; having the measuring cup lid rotatably slide into place; having more or fewer than two blades to feed the extruder; changing the shape of the mixing bin or two piece enclosure, or measuring cup; using a different transmission such as a belt or worm gear drive; integrating the mixing/extruder blades with the extruder screw; locating the motor in a different position such as with its shaft disposed right to left instead of fore to aft; channeling the air flow different such as taking air from below the embodiment and blowing at the ingredients emerging from the extrusion die from an enclosure extended to one or both sides of the die; etc.

Such changes and modifications can be made without departing from the spirit and scope of the invention. Accordingly it is intended that all such changes and modifications be covered by the appended claims and equivalents.

upper extruder feed blade 110 is supported by an arm 112 lower extruder feed blade 108 is a straight rod-like projection which is mounted parallel with the drive shaft 86 on another 30 degree off vertical forward 33 inclined radial arm 114 which is integral and positioned on the cylindrical tubular shaft 100 a series of discrete, separated, narrow, shallow, sharp, upward facing step shaped protrusions 116 projections 117 and 119 on the interior and exterior of extruder housing 32 assist in mixing and extrusion detachable, hinged, molded, clear polymeric lid 118 smaller left-hand 58 indented area 120 has a "U" shaped trough 121 right 122 indented areas projecting off the rear of the lid, and positioned on both sides of the rigid flat lever 130, are two short vertical ribs 123 and 125 larger right-hand indented area 122 is surrounded by low vertical walls and has an interior inclined planar surface 124 sloping about 15 degrees off horizontal open segmented grate 126 ribs project back through holes 127 and 129 in the back flat wall 96 narrow slot 128 when the lid is closed on the mixing bin, the right-hand rib pivots through a hole 131 in the stepped enclosure a rigid flat lever 130 which terminates along the full length of its back edge in an upward facing hook 132 front 33 of the lid has a molded on latch 133 upward facing hook 132 which engages a reciprocal downward facing catch 134 in the top of the step shaped enclosure 28 wide horizontal flexible flat rib 135 wide vertical rigid flat rib 137 rigid flat rib 137 which has left 58 and right 60 rear facing projections 138 forward 33 facing undercuts 140 flat rear wall has two rear facing cylindrical pins 141 and 143 rib 148 is pierced by two holes 151 and 153 which engage pins 144 molded into the stepped shaped enclosure 28 two rear facing cylindrical pins 141 and 143 which engage holes 145 and 147 in the stepped shaped enclosure 28 the enclosure has a forward facing shallow cylindrical projection 146 surrounding the drive shaft 86 entry 85 into the mixing bin mixing bin on both the upper left and upper right sides of its flat rear wall has two rear facing cylindrical pins 141 and 143 which engage holes 145 and 147 in the stepped shaped enclosure 28 there is a vertical rib 148 projecting from the lower front section of the mixing bin shallow projection 146 engages a hole 149 penetrating the flat rear wall of the mixing bin extruder housing 32 which is disposed within the bin 22 is capped at its back with an integral vertical wall 150

148 is pierced by two holes 151 and 153 which engage pins 144 molded into the stepped shaped enclosure 28 stainless steel washer 152 insert molded plastic bearing washer 154 snapped on the book of the extruder screw 30 plastic bearing washer 154 has densely packed bulls-eye-like concentric grooves 156 extruder feed hole 158 a lower extruder housing clearing hole 160 extruder housing 32 is integrally molded into a large vertical flat circular disc 162 three symmetrically space bayonet type latches 164 three symmetrically space bayonet type latches 164 on its perimeter which cooperate with grooves 165 and stops 167 on wall 94 a rod like clearing projection 166 die extrusion holes 168

Four long shallow steps 170 in the front 33 half of the interior wall of the extruder housing 32, and running parallel with the mixer/extruder drive shaft 86, help the extruder screw 30 build ingredient pressure against the extruder die 38 threaded die nut 172 plurality of female buttress threads 174

Castellated indents 176 on the forward perimeter of the die nut cylindrical tube 178 is integrally coupled parallel with the drive shaft 86 axis on the right 60 side of the die nut 172

One of the tubes 180 is longer a small finger handle 182 which permits the blade to be rotated 34 36 extrusion dies 38 may have holes 168 with cross sections comprising a forward 33 segment having parallel walls 184 a widely taper rear segment 186

The dies are subjected to tremendous pressure during extrusion, interlocking annular projections on the forward outer perimeter of each die 188

- interlocking annular projections on the forward outer perimeter of each die 188 and on the rear inner perimeter of the die nut center hole 190 engage each other to lock the die in place during extrusion
- cup is rectangular in plan view with transparent generally vertical side walls 42 which are marked 194 with horizontal lines
- the measuring cup's lid 40 is slid 198 to its closed position
- lid of the measuring cup is then slid open 198
- cup has a low wall 200 above the lid
- measuring cup 40 also has pouring spouts 202
- double-pull-double-throw three position forward-off-reverse switch 50 has a safety push button 204
- switch's slide lever 206
- flexing portion 208 of the rib 204
- allows the top portion of the rib to flex away 210 from the switch slide
- flexing molded fib has a tapered catch 212
- switch being moved from its off 214 to its mix 216 position or vise versa or from its extrude 218 to its off 214 position
- measuring cup's lid had a stop 220 which prevents the lid from being accidentally removed from the cup
- forward two support feet 222 and the lower forward lip 224 counter top 226
- tab 240 which, when the lid 118 is lowered, engages into a groove 242
- integral vertical wall 150 having a central hole 302
- the interior 308 of the generally cylindrical molded polymeric extruder housing 32
- lid is opened as shown in the dotted lines 306 in FIG. 17A circuit 244

We claim:

1. A motor driven food extruding device having simplified assembly and added safety comprising:
   a) a housing containing a motor and drive mechanism,
   b) a chamber in which food product is mixed and said chamber containing at least one mixing element energized by said motor and drive mechanism,
   c) an extruder coupled to said chamber and operable to accept and extrude food product mixed therein,
   d) said chamber being mountable to said housing,
   e) said chamber having an opening to accept food product with a pivoting lid operable to cover and uncover said opening,
   f) said lid having at least one coupling member fastening said mixing chamber to said housing when said lid is rotated to cover said opening, whereby said chamber may be secured to said housing merely by closing said lid.

2. The device of claim 1 wherein said lid, when opened, can disengage from, and is able to be lifted free of, said chamber.

3. The device of claim 1 wherein said lid is formed to rest in a stable position on said housing when said lid is pivoted to uncover said opening.

4. A motor driven food extruding device with enhanced safety and convenience features comprising:
   a) a mixing chamber containing at least one motor driven mixing element,
   b) said mixing chamber having a plurality of side walls at least one of which contains a removable section mounting a motor driven food product extruder,
   c) said mixing chamber having an opening for accepting food product,
   d) a hinged lid operable to cover and uncover said opening,
   e) said hinged lid engaging said removable section such that it is fastened to said mixing chamber when said hinged lid is covering said opening, whereby safety and convenience are enhanced by the removable wall section containing said extruder being locked to said mixing chamber whenever said hinged lid is covering said mixing chamber opening.

5. The device of claim 4 wherein said removable section engages and disengages the side wall it couples to utilizing at least one rotationally engaged element, and when said hinged lid is covering said opening, rotation of said at least one rotationally engaged element is blocked by a member linked to said hinged lid.

* * * * *

UNITED STATES PATENT AND TRADEMARK OFFICE
CERTIFICATE OF CORRECTION

Figure 18:
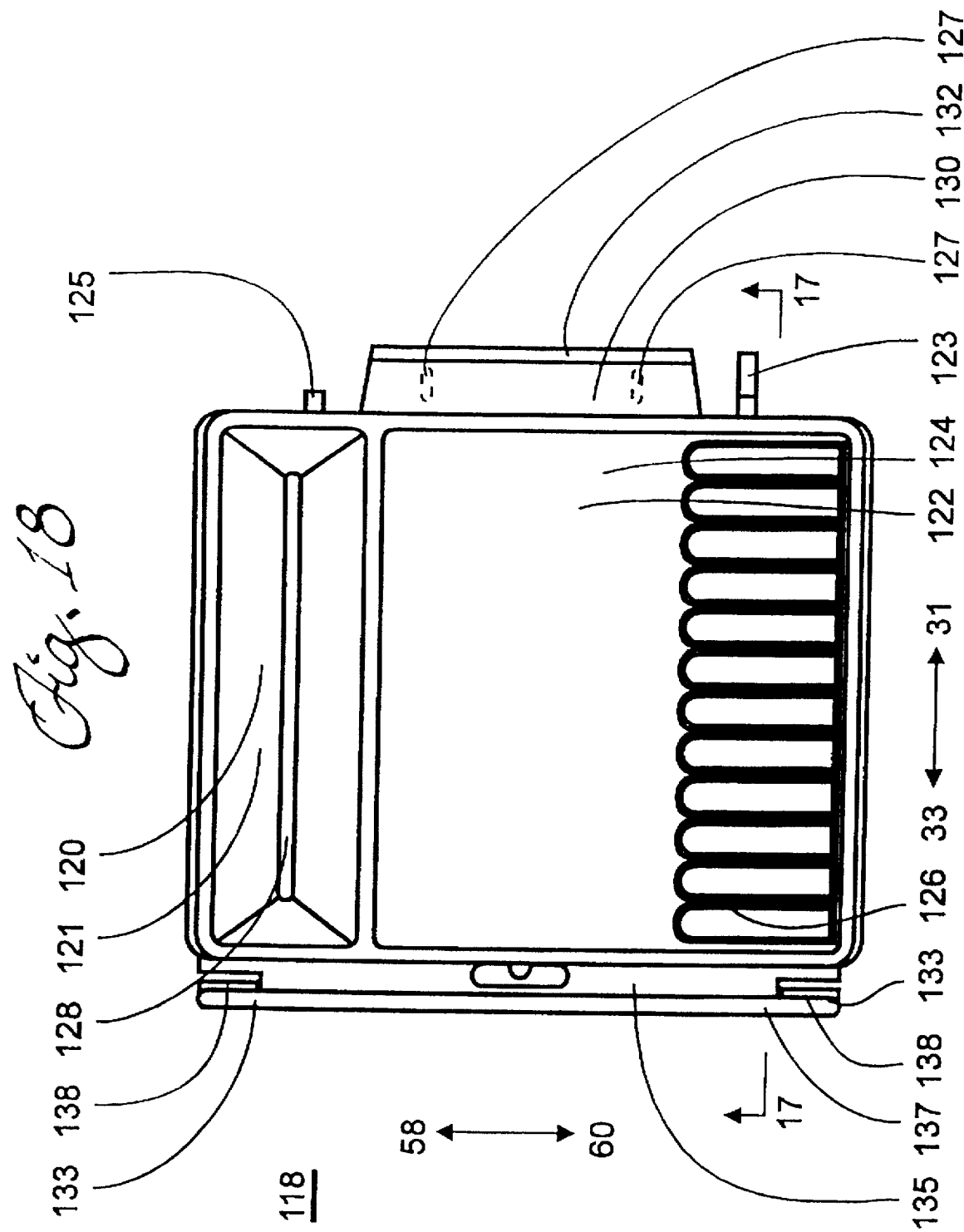
FIG. 18 is a top view of the lid shown in FIG. 17.

PATENT NO. : 5,731,012
DATED : March 24, 1998
INVENTOR(S) : Alan L. Backus; Ronald M. Popeil It is certified that error appears in the above-indentified patent and that said Letters Patent is hereby corrected as shown below:

Column 2, line 10, replace "in FIG. 1b." with -- in FIG. 18 --.
Column 22, line 31, before "148" insert -- rib --.
Column 22, line 35, replace "book" with -- back --.

Signed and Sealed this

Twenty-second Day of December, 1998

Attest:

BRUCE LEHMAN

*Attesting Officer*          *Commissioner of Patents and Trademarks*